(12) United States Patent
Stapleton et al.

(10) Patent No.: US 12,106,212 B2
(45) Date of Patent: Oct. 1, 2024

(54) MACHINE LEARNING MODEL VALIDATION AND AUTHENTICATION

(71) Applicant: KONINKLIJKE PHILIPS N.V., Eindhoven (NL)

(72) Inventors: Shawn Arie Peter Stapleton, Bothell, WA (US); Amir Mohammad Tahmasebi Maraghoosh, Arlington, MA (US)

(73) Assignee: Koninklijke Philips N.V., Eindhoven (NL)

( * ) Notice: Subject to any disclaimer, the term of this patent is extended or adjusted under 35 U.S.C. 154(b) by 1263 days.

(21) Appl. No.: 16/741,824

(22) Filed: Jan. 14, 2020

(65) Prior Publication Data
US 2020/0234121 A1    Jul. 23, 2020

Related U.S. Application Data

(60) Provisional application No. 62/793,517, filed on Jan. 17, 2019.

(51) Int. Cl.
*G06N 3/08* (2023.01)
*G06N 3/02* (2006.01)
*G06N 20/00* (2019.01)

(52) U.S. Cl.
CPC .............. *G06N 3/08* (2013.01); *G06N 3/02* (2013.01); *G06N 20/00* (2019.01)

(58) Field of Classification Search
CPC ............ G06N 3/08; G06N 3/02; G06N 20/00; G06N 3/045; G06N 3/044; G06N 3/047;
(Continued)

(56) References Cited

U.S. PATENT DOCUMENTS

| 2012/0191631 A1* | 7/2012 | Breckenridge | ........ G06N 20/00 706/12 |
| 2015/0379072 A1* | 12/2015 | Dirac | ..................... G06N 20/00 707/693 |

(Continued)

FOREIGN PATENT DOCUMENTS

WO    2018171663 A1    9/2018

OTHER PUBLICATIONS

Orlandi, Claudio, Alessandro Piva, and Mauro Barni. "Oblivious neural network computing via homomorphic encryption." EURASIP Journal on Information Security 2007 (2007): 1-11. (Year: 2007).*

(Continued)

*Primary Examiner* — Michael J Huntley
*Assistant Examiner* — Sehwan Kim

(57) ABSTRACT

The present disclosure is directed to methods and apparatus for validating and authenticating use of machine learning models. For example, various techniques are described herein to limit the vulnerability of machine learning models to attack and/or exploitation of the model for malicious use, and for detecting when such attack/exploitation has occurred. Additionally, various embodiments described herein promote the protection of sensitive and/or valuable data, for example by ensuring only licensed use is permissible. Moreover, techniques are described for version tracking, usage tracking, permission tracking, and evolution of machine learning models.

20 Claims, 17 Drawing Sheets

(58) Field of Classification Search
CPC .......... G06N 5/01; G06N 20/10; G06N 20/20; G06F 21/31; G06F 21/62
See application file for complete search history.

(56) References Cited

U.S. PATENT DOCUMENTS

| | | |
|---|---|---|
| 2016/0350648 A1 | 12/2016 | Bilenko et al. |
| 2017/0372201 A1 | 12/2017 | Gupta et al. |
| 2018/0096248 A1 | 4/2018 | Chabanne et al. |
| 2019/0347538 A1* | 11/2019 | Lee .................. G06F 18/24143 |

OTHER PUBLICATIONS

Reed, and Helferty. "A translation/rotation invariant neural network trained via conjugate gradient optimization." IEEE 1989 International Conference on Systems Engineering. IEEE, 1989. (Year: 1989).*

Sun, Yi, Xiaogang Wang, and Xiaoou Tang. "Deep learning face representation from predicting 10,000 classes." Proceedings of the IEEE conference on computer vision and pattern recognition. 2014. (Year: 2014).*

Xu, Hui, et al. "Deepobfuscation: Securing the structure of convolutional neural networks via knowledge distillation." arXiv preprint arXiv:1806.10313 (2018). (Year: 2018).*

Jung, Heechul, et al. "Less-forgetting learning in deep neural networks." arXiv preprint arXiv:1607.00122 (2016). (Year: 2016).*

Gu, Zhongshu, et al. "Securing input data of deep learning inference systems via partitioned enclave execution." arXiv preprint arXiv:1807.00969 (2018): 1-14. (Year: 2018).*

Yu, Lean, Shouyang Wang, and Kin Keung Lai. "Credit risk assessment with a multistage neural network ensemble learning approach." Expert systems with applications 34.2 (2008): 1434-1444. (Year: 2008).*

* cited by examiner

```
# activation function (e.g. sigmoid)
f = lambda x: 1.0/(1.0 + np.exp(-x))
# calculate first hidden layer activations (b₁ = bias)
# Apply gating, where G(k) = 1 if valid digital key (k) provided.
# Else G (k) = 0
h₁ = f((dot(W₁, I) + b₁) * G(k)) # Alternatively, h₁ = h₁ * G(k)

# calculate second hidden layer activations
h₂ = f(dot(W₂, h₁) + b₂)
O = dot(W₃, h₂) + b₃ # output
```

```
# activation function (e.g. sigmoid)
f = lambda x: 1.0/(1.0 + np.exp(-x))
# calculate first hidden layer activations (b1 = bias)
# Apply gating, where G(k) = 1 if valid digital key (k) provided.
# Else G (k) = 0
h1 = f(dot(W1, I) * G(k) + b1)
# Alternatilvely, apply gating post activation
h1 = h1*G(k)
# calculate second hidden layer activations
h2 = f(dot(W2, h1) + b2)
O = dot(W3, h2) + b3 # output
```

MACHINE LEARNING MODEL VALIDATION AND AUTHENTICATION

TECHNICAL FIELD

Various embodiments described herein are directed generally security and artificial intelligence. More particularly, but not exclusively, various methods and apparatus disclosed herein relate to validating and authenticating use of machine learning models.

BACKGROUND

Artificial intelligence ("AI") components such as machine learning models (also referred to as "statistical models") are usable to apply complex computations to complex input to generate various types of output outputs. However, with many of the complex and/or autonomous tasks for which machine learning models are employed, a security breach poses serious risk to data privacy and/or safety. For example, machine learning models are becoming increasingly common in the healthcare domain, where they are used in a wide variety of applications, such as clinical decision support ("CDS"), controlling medical devices, and so forth. Regulations such as the Health Insurance Portability and Accountability Act ("HIPAA") place a premium on patient privacy. Moreover, a breach in security of the input data, changes in the integrity of mathematical operations performed based on the machine learning model and/or of parameters of the model itself can each lead to erroneous output, which can be especially devastating in the medical domain.

Determining whether a machine learning model has been compromised is challenging. An attacker has several approaches to compromise a machine learning model to make it operate in unexpected and/or malicious ways, such as modifying weights, exploiting vulnerabilities at the input (which could lead to consistent malicious output), or by bypassing the algorithm with custom code. These malicious attacks can be accomplished either by modifying the machine learning model in non-volatile memory (e.g., "on disk"), or in real-time during execution using volatile memory (e.g., random access memory, or "RAM").

SUMMARY

The present disclosure is directed to methods and apparatus for validating and authenticating use of machine learning models. For example, various techniques are described herein to limit the vulnerability of machine learning models to attack and/or exploitation of the model for malicious use, and for detecting when such attack/exploitation has occurred. Additionally, various embodiments described herein promote the protection of sensitive and/or valuable data, for example by ensuring only licensed use is permissible. Moreover, techniques are described for version tracking, usage tracking, permission tracking, and evolution of machine learning models.

Various examples are described herein relating to healthcare. In particular, example techniques depicted and/or demonstrated by the figures are often described in the healthcare context. However, this is not meant to be limiting. Techniques described herein are broadly applicable outside of the healthcare context. For example, techniques described herein may be employed at security checkpoints at which image data is used in combination with training machine learning models (e.g., convolutional neural networks) to determine threats/risks posed by individuals. They may also be applied in other situations in which machine learning is commonly employed, such as financial analysis, risk analysis, and so forth.

Examples described herein may also be used to vary the level of detail and/or granularity provided to end users. For example, techniques described herein may cause block one (e.g., final) output layer of a trained machine learning that is configured to make a classification based on upstream input. However, the upstream input may still be useful for a variety of purposes.

As an example, the final layer of a neural network may be trained to receive segmented image data, e.g., indicative of regions of interests for potential cancer concern, and to classify one or more of those regions of interest as malignant or benign. However, the segmented image data provided by the prior layer may be useful even without being used for classification, for instance, to annotate regions of interest for potential cancer concern in a digital image. Accordingly, if a nurse or other medical personnel of similar qualifications or clearance provides their credentials to the model, the model may block forward propagation of data through the final layer and only provide the segmented image data, which may then be used to, for example, generate a heat map showing areas of general concern, without providing specific classifications of malignancy or being benign. However, if a radiologist provides his or her credentials, then the final layer may be activated (or unblocked) and the radiologist may receive classifications for each region of interest.

Generally, in one aspect, a method may be implemented using one or more processors and may include: providing a digital key that is associated with a particular entity, wherein the particular entity has access to a machine learning model that is trained to generate one or more outputs based on data applied across a plurality of inputs; causing the digital key to be applied as input across at least a first portion of the trained machine learning model to transition one or more gate nodes that are interspersed within the trained machine learning model between a locked and an unlocked state; and causing other input data to be applied as input across at least a second portion of the trained machine learning model to generate one or more of the outputs. In various embodiments, in the unlocked state, a given gate node of the one or more gate nodes allows data received from an upstream layer of the trained machine learning model to pass unaltered to a downstream layer of the trained machine learning model. In various embodiments, in the locked state, the given gate node does not allow the data received from the upstream layer of the trained machine learning model to pass unaltered to the downstream layer of the trained machine learning model.

In various embodiments, in the unlocked state, the given gate node multiplies the data received from the upstream layer of the trained machine learning model by one, and in the locked state, the given gate node multiplies the data received from the upstream layer of the trained machine learning model by zero.

In various embodiments, the first portion of the trained machine learning model includes a first subset of consecutive input nodes of an input layer of the trained machine learning model, and wherein the second portion of the trained machine learning model includes a second subset of consecutive input nodes of an input layer of the trained machine learning model. In various versions, the first and second subsets are coupled with an input scrambler that shuffles the first subset of consecutive input nodes with the second subset of consecutive input nodes. In various such versions, an input descrambler is coupled between one or more layers of the trained machine learning model that are downstream from one or more hidden layers of the trained machine learning model.

In various embodiments, the one or more gate nodes include a gated layer of gate nodes that is inserted between two layers of the trained machine learning model. In various versions, the gate nodes of the gated layer are transitioned between the unlocked and locked states by a single key lock routine that receives, as input, the digital key.

In various embodiments, between two layers of the trained machine learning, one or more of the gate nodes are coupled between a first pair of respective nodes of the two layers, and a second pair of respective nodes of the two layers are directly coupled. In various embodiments, a first gate node of the one or more gate nodes is transitioned between the locked and unlocked state by a first portion of the digital key, and a second gate node of the one or more gate nodes is transitioned between the locked and unlocked state by a second portion of the digital key that is different than the first portion of the digital key.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

In another aspect, at least one non-transitory computer-readable medium may be provided that comprises data forming a trained machine learning model, wherein the trained machine learning model comprises: an input layer that accepts a plurality of input data points; at least one hidden layer for performing computations on the input data points; an output layer for providing at least one output value based on the computations; and at least one gate node that, conditioned on at least one of the input data points, selectively allows or prevents data received from an upstream layer of the trained machine learning model to pass unaltered to a downstream layer of the trained machine learning model.

"Homomorphic encryption" is a form of encryption that allows computation on encrypted data. Homomorphic encryption generates an encrypted result which, when decrypted, matches the result of the operations as if they had been performed on the original, unencrypted data.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating various principles of the embodiments described herein.

DETAILED DESCRIPTION

Artificial intelligence ("AI") components such as machine learning models (also referred to as "statistical models") may be exposed to various security risks. A breach in security of the input data, as well as changes in the integrity of mathematical operations performed based on the machine learning model and/or of parameters of the model itself, can each lead to erroneous output. Machine learning models are often developed to perform complex and/or autonomous tasks for which a security breach poses serious risk to data privacy and safety. For example, machine learning models are becoming increasingly common in the healthcare industry, where regulations such as the Health Insurance Portability and Accountability Act ("HIPAA") place a premium on patient privacy. Thus, in addition the models being at risk for malicious manipulation, access to the models may also require strict security. In view of the foregoing, various embodiments and implementations of the present disclosure are directed to validating and authenticating use of machine learning models.

Figure 1:
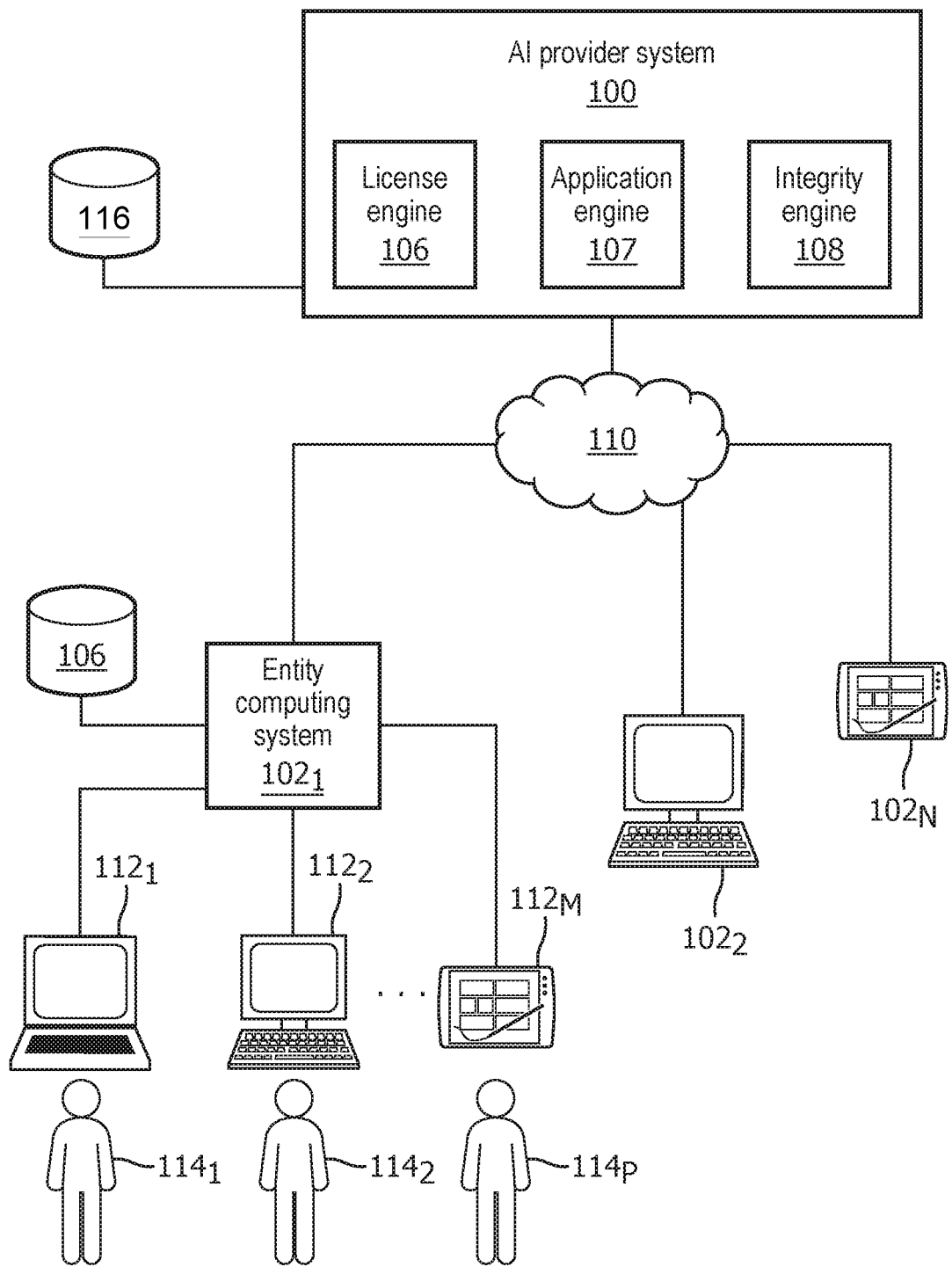
FIG. 1 illustrates an example environment in which selected aspects of the present disclosure may be implemented, in accordance with various embodiments.

Referring to FIG. 1, an example environment is schematically depicted in which selected aspects of the present disclosure may be implemented, in accordance with various embodiments. An AI provider system 100 may include one or more computing devices and/or servers (e.g., blade servers) that is operated by an entity such as a business, government entity, individual, non-profit, organization, etc., to provide AI services to others. In various embodiments, AI provider system 100 may be communicatively coupled with one or more remote computing systems $102_{1-N}$ over one or more wired and/or wireless computing networks 110 (e.g., the Internet). In some implementations, AI provider system may be implemented across multiple computing devices forming what may be referred to as a "cloud" infrastructure or "the cloud."

In various implementations, AI provider system 100 may provide, to one or more individuals ("users"), access to one or more machine learning ("ML") models. The users may use the ML models for various purposes, such as making predictions, classifications, diagnoses (e.g., clinical decision support, or "CDS"), operating equipment (e.g., altering medical equipment parameters), performing object and/or entity recognition, handwriting recognition, and so forth. In some embodiments, AI provider system 100 may provide various levels of ML model access to different individuals and/or entities, depending on credentials provided by and/or on behalf of the individuals and/or entities.

In FIG. 1, a first remote computing system $102_1$ may take the form of, for instance, a healthcare or hospital computing system/network that includes one or more computing devices, servers, instruments, smart appliances, networked medical devices, etc. First remote computing system $102_1$ may further include, for example, various healthcare-related computing subsystems (not depicted), such as a hospital information system ("HIS"), an electronic health records ("EHR") database, and so forth. In various implementations, a plurality of client devices $112_{1-M}$ operated by a plurality of users $114_{1-P}$ (e.g., medical personnel) may connect to computing system $102_1$, e.g., over one or more networks (not depicted, could include the Internet). In addition to or instead of servicing systems of multiple computing devices, AI provider system 100 may service individual computing devices, such as $102_2$ and $102_N$.

In various implementations, one or more ML models may be stored by AI provider system 100 in a ML model database 104. These ML models may take various forms, such as deep learning neural networks, recurrent neural networks ("RNNs"), convolutional neural networks ("CNNs"), support vector machines, decision trees, reinforcement learning models, adversarial generative networks ("GANs"), and so forth. AI provider system 100 may make these ML models available to remote computing systems 102 in various ways. In some implementations, remote computing systems 102 may download copies of ML models from database 104 and store them locally, e.g., in their own databases (e.g., 116). Additionally or alternatively, in some implementations, AI provider service 100 may retain the ML models exclusively in database 104, and may apply data received from remote computing systems 102 across the ML models on demand. In some such implementations, AI provider system 100 and/or the remote computing system 102 may encrypt the exchanged data (e.g., input to the ML model, output generated from the ML model, etc.).

In some implementations, AI provider system 100 may include a license engine 106, an application engine 107, and/or an integrity engine 108. These engines may be implemented using any combination of software and hardware, and may be implemented on a single computing device or across multiple computing devices (e.g., as "cloud-based components"). In other embodiments, one or more of engines 106-108 may be combined and/or omitted, or implemented at least in part on another computing system, such as on remote computing system $102_1$.

License engine 106 may be configured to examine credentials provided by or on behalf of individual users and/or entities to determine which ML models the individual users/entities should have access, what level of access the individual users/entities should have to each ML model, how long and/or for how many distinct uses each individual user/entity should have access to particular ML models, etc. Put another way, license engine 106 may be configured to authenticate users and/or entities to use various ML models, whether stored locally by AI provider service 100 in database 104 and/or stored remotely at one or more remote computing systems 102 (e.g., in database 116).

Application engine 107 may be configured to apply input across the one or more ML models stored in database 104 to generate output. As mentioned previously, in some embodiments, AI provider service 100 may retain ML models locally in database 104, and may, by way of application engine 107, receive input from remote computing systems 102 that is to be applied across those ML models by application engine 107. For example, in some implementations, a remote computing system 102 may provide input data (e.g., digital images, waveforms, text, etc.) to AI provider service 100. Application engine 107 may apply this input data across one or more ML models (e.g., for which the entity/user operating the remote computing system 102 is licensed, selects, etc.) to generate output. Data indicative of the output, and/or the output itself, may be returned to the remote computing system 102. In other embodiments, however, one or more remote computing systems 102, such as entity computing system $102_1$, may download the ML models it will be using and store them locally, e.g., in database 116. In some such embodiments, the remote computing system 102 may have its own application engine (not depicted) that applies data across the locally-stored ML model.

Integrity engine 108 may be configured to examine various aspects of ML models stored locally to AI provider system 100 (e.g., in database 104) and/or remotely, e.g., in database 116, to determine whether and/or how those ML models may have been compromised. For example, a malicious party may gain access to a ML model stored in database 116 and may alter one or more aspects of the ML model, such as altering or deleting one or more parameters or weights in various layers. Alternatively, a licensed entity may attempt to make changes to its locally stored model when it is not licensed to do so. In either case, integrity engine 108 may be configured to apply various techniques described herein, or cause these techniques to be applied at one or more remote computing systems 102, in order to verify the integrity of a ML model and/or to take appropriate remedial action when it determines that a ML model has been compromised. In some embodiments, integrity engine 108 may verify the integrity of a ML model by applying a digital key as input across the ML model to generate output, which is then verified by integrity engine 108 as described herein.

In some implementations in which a ML model is stored remotely from AI provider system 100, e.g., in database 116, one or more client devices $112_{1-M}$ and/or entity computing system $102_1$ may host a software application that is operable by end users 114 to make use of the ML model. In some implementations, this software application may be provided (e.g., in an app store) and maintained by AI provider system 100. In some such embodiments, AI provider system 100, e.g., by way of integrity engine 108, may retain the right to cause the remotely-executing software application to periodically perform techniques described herein, such as techniques employed by integrity engine 108.

For example, in some embodiments, when a particular user 114 (e.g., a nurse) operates a client device 112 to interact with the software application, the nurse may log into the client device 112 with one or more credentials. These credentials may authenticate the nurse to utilize the software application to apply data across one or more ML models. The nurse may not be made explicitly aware that he or she will be accessing a ML model. Rather, the nurse may simply interact with a graphical user interface ("GUI") or other input component to see some patient data that is generated by a CDS algorithm in response to various other data. The CDS algorithm itself may apply the appropriate input data across the appropriate ML model to generate output. The output itself, or some other data generated from the output (e.g., a classification, predication, etc.) may then be presented to the nurse via the software application. In some embodiments, the nurse's credentials may restrict the nurse's access to some models, while denying the nurse access to other models (which, if the nurse attempted to use functionality that relied on restricted models, might provide audio or visual output such as "You are not authorized to perform this operation"). Additionally or alternatively, in some embodiments, the nurse's credentials may restrict what is ultimately output from the model, as will be described in more detail below.

In some embodiments, prior to the clinical data being applied across the ML model, the nurse's credentials or some other piece of data (e.g., a digital key) retrieved based on the nurse's credential may be retrieved and applied as input across at least a portion of the ML model, e.g., immediately prior to the "actual" clinical data that will be applied. The ML model may generate what will be referred to herein as one or more "verification outputs" based on the applied data. These verification outputs may be compared to known verification outputs, e.g., by integrity engine 108 or locally at entity computing system 102$_1$ (or even at the client device 114 being operated by the nurse).

These known verification outputs may have been generated, for instance, based on prior application of the piece of data as input across at least a portion of the ML model. If the verification outputs match or otherwise correspond to the known verification outputs, the ML model may be considered "uncompromised." Then, the clinical data under consideration by the nurse may be applied as input across the ML model to generate the output described previously. In various implementations, the nurse may not even be made aware that the integrity of the ML model was tested, or that a ML model was utilized.

In addition to or instead of immediately prior to application of clinical data across a ML model, the ML model's integrity may be verified at other points in time. For example, in some implementations, integrity engine 108 may periodically request that remotely-executing software applications that provide users with access to ML models perform techniques described herein, e.g., once an hour, once a day, at nighttime, on the weekend, etc. In some embodiments, the remotely-executing software itself may be configured to periodically verify the integrity of its locally-stored ML models. Additionally or alternatively, in some implementations, integrity engine 108, alone or in combination with application engine 107, may employ techniques described herein—periodically, on demand, randomly, etc.—to verify the integrity of ML model(s) stored in database 104. In some embodiments, the digital key or other piece of data used to verify a ML model's integrity may be applied across the model in conjunction with clinical inputs. Examples of this will be described herein.

Various techniques may be employed, e.g., by integrity engine 108, to verify integrity of ML models. For example, and referring now to FIG. 2, an example ML model in the form of a feed-forward neural network ("FFNN") 220 is depicted. As noted previously, FFNN 220 may be stored locally to AI provider system 100 in database 104, or remotely on one or more remote computing systems 102 (e.g., in database 116). FFNN 220 includes multiple layers, including an input layer 221, two hidden layers 222$_{1-2}$, two sets of weights 223$_{1-2}$ between various layers, and an output layer 224. FFNN 220 is provided for illustrative purposes only, and therefore is relatively small. It should be understood that the techniques described herein are applicable to networks having other arrangements, including networks having more or less layers, more or less nodes, etc. For example, many neural networks have far more inputs than FFNN 220, far more layers, and may include other components, such as memory nodes (e.g., long short-term memory nodes, gated recurrent units, etc.). Furthermore, the technique herein is applicable to any machine learning model, including decision trees (e.g. random forest), support vector machines, and logistic regression, etc. The technique applies to both supervised and unsupervised models, as well as regression and classification models.

In various embodiments, to verify the integrity of FFNN 220, a piece of data such as a unique identifier or a digital key 226 may be applied as input across FFNN 220 to generate output. Digital key 226 may take various forms. In some embodiments, digital key 226 may take the form of a secure private key generated using, for instance, the Data Encryption Standard ("DES"), Digital Signature Algorithm ("DSA"), Triple DES, Advanced Encryption Standard ("AES"), Twofish, Rivest-Shamir-Adleman ("RSA"), and/or pretty good privacy ("PGP"), etc. However, other types of digital keys (or more generally, pieces of data) and/or techniques for generating them may be employed. In some embodiments, the piece(s) of data applied across FFNN 220 to verify its integrity, such as digital key 226, may be unique to FFNN 220 and one or more users or entities that utilizes FFNN 220. As will be discussed shortly, in some embodiments, digital key 226 may also be used as a reference to a (secure) lookup table that provides various information (e.g., metadata) about FFNN 220, such as its version, usage, user permissions, training history, etc.

Figure 2:
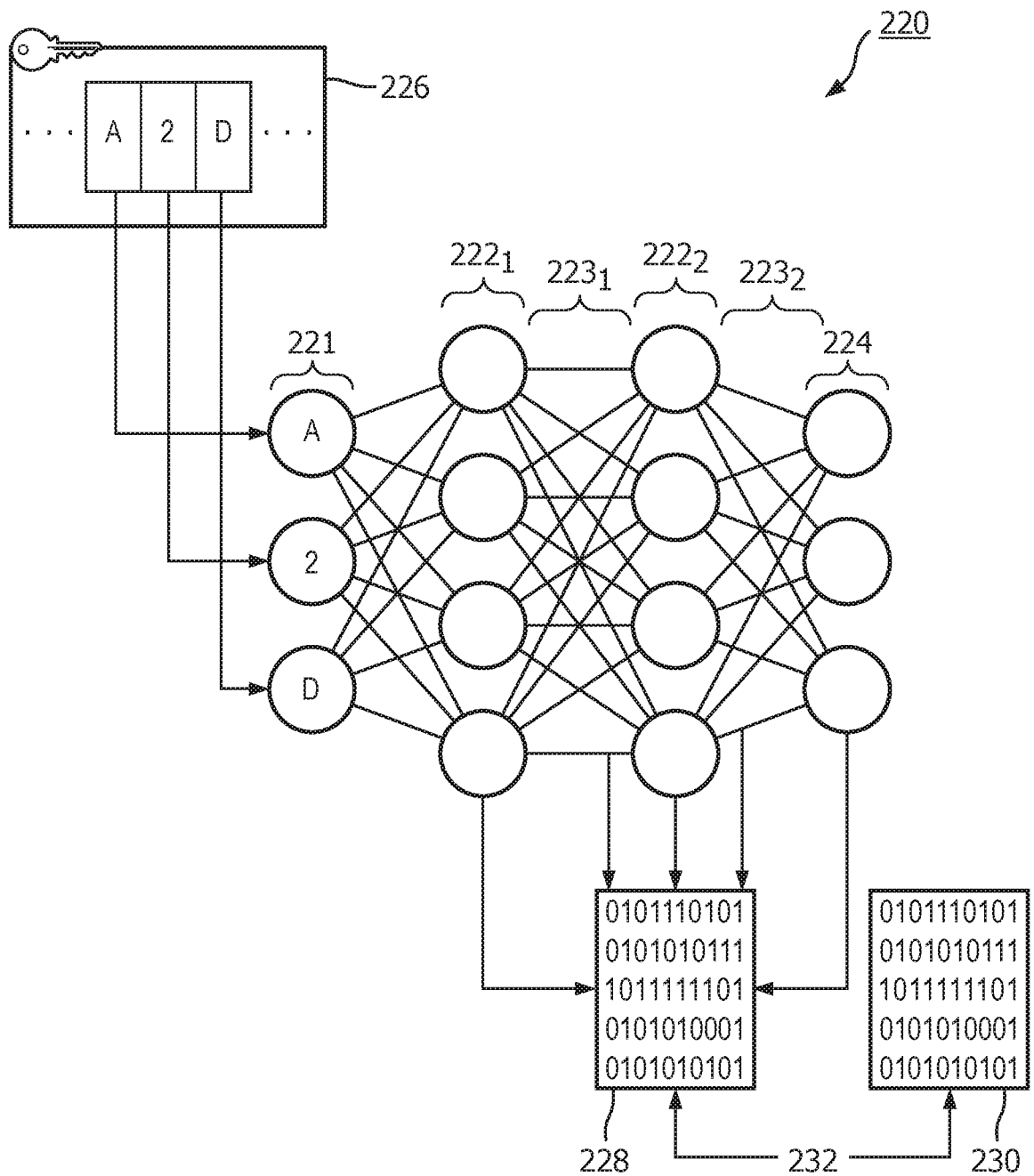
FIG. 2 depicts an example of how the integrity of a machine learning model may be verified, in accordance with various embodiments.

In various implementations, digital key 226 may be applied as input across all or portion(s) of FFNN 220 in various ways. For example, digital key 226 may be applied as input to input layer 221, as depicted in FIG. 2. In some such embodiments, a dimension of digital key 226 (e.g., how many distinct characters, numbers, symbols, and/or elements it contains) may match the dimension of input layer 221, though this is not required. Additionally or alternatively, in some embodiments, digital key 226 may be applied at any other layer and/or at individual node(s), in the forward direction (right in FIG. 2) or even in the reverse direction (left in FIG. 2). Verification output(s) 228 generated by various portions of FFNN 220 based on digital key 226 may then be compared to known verification outputs 230, e.g., as shown at arrow 232. If the verification outputs 228 match or otherwise correspond to known verification outputs 230, then FFNN 220 may be deemed uncompromised. Otherwise, FFNN 220 may be deemed compromised, and various remedial actions may be taken, such as raising an alarm at AI provider system 100 and/or locally at remote computing system 102, removing access to FFNN 220, etc.

In FIG. 2, digital key 226 is applied at the entire input layer 221. Then, outputs from both hidden layers $221_{1-2}$, weight data $223_{1-2}$, and output data from output layer 224 are captured and combined to generate the verification outputs 228. These data may be combined in various ways, using various proprietary or other algorithms. In other embodiments, other combinations of outputs generated by FFNN 220 may be captured to generate verification outputs, different than those depicted in FIG. 2. For example, output of any combination of individual nodes may be captured for verification output, or verification output may be taken simply as the output from output layer 224 alone.

Known verification outputs 230 may be precomputed, e.g., in a secure environment, prior to verification of FFNN 220. For example, whenever FFNN 220 is trained or retrained, e.g., by AI provider system 100, digital key 226 may be applied across all or portion(s) of FFNN 220 to generate output. Output of various nodes and/or layers may be captured to generate known verification output 230. This known verification output 230 may then be saved, e.g., in non-volatile memory (e.g., locally to AI provider system 100 in database 104 or remotely in database 116). In some implementations known verification output 230 may be encrypted when stored in non-volatile memory, e.g., so that end users cannot access it. Additionally or alternatively, known verification output 230 may be encrypted using a public key assigned to an entity that operates a remote computing system 102. That same entity may be provided with a private digital key, such as 226, that can be both applied across FFNN 220 for verification purposes and used to decrypt known verification data 230. Alternatively, a different private key, distinct from digital key 226, may be used to decrypt known verification data 230.

So long as digital key 226 is applied across the same portion(s) of FFNN 220 when generating the known verification output 230 as when later generating verification output 228, and so long as the same output from the same combination of nodes/layers is captured, then verification output 228 and known verification output 230 should be comparable (e.g., match). Consequently, in some embodiments, if subsequent verification output 228 is generated that does not match known previously-generated verification outputs 230, that may indicate that FFNN 220 has been compromised.

FFNN 220 may take various forms, such as a convolutional neural network, a "deep learning" network, a generative adversarial network ("GAN"), and so forth. And while FFNN 220 is depicted as a feed-forward neural network in FIG. 2, this is not meant to be limiting. In other embodiments, other types of ML models may be employed with techniques described herein, such as recurrent neural networks, long short-term memory ("LSTM") networks, ensemble networks, and so forth.

Figure 3:
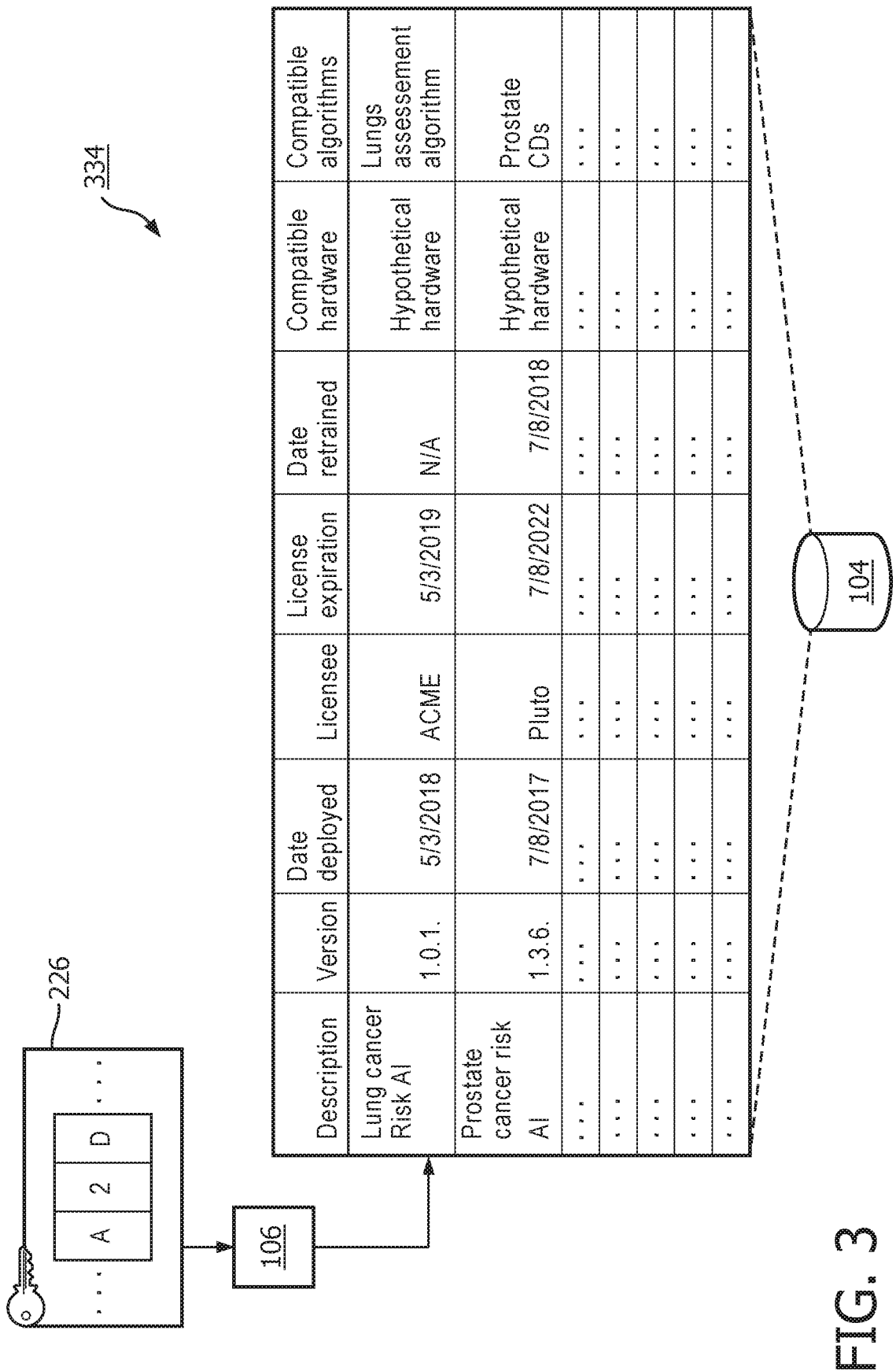
FIG. 3 depicts one example of how a digital key used to verify the integrity of a machine learning model may also be used to authenticate use of the machine learning model, in accordance with various embodiments.

FIG. 3 depicts an example of a lookup table 334 that may store information usable, e.g., by license engine 106, to determine information about ML models stored in database 104 (or ML models stored remotely, such as in database 116 or on local volatile or non-volatile memory of remote computing systems $102_2$, $102_N$, etc.). In various implementations, license engine 106 may receive, as input, digital key 226. License engine 106 may perform various types of functions to map digital key 226 to one or more records in lookup table 334. For example, in some embodiments, license engine 106 may perform various hash functions to map digital key 226 to one or more records of lookup table 334.

In this example, license engine 106 performs computations (e.g., hash function) to map digital key 226 to a first entry of lookup table 334. This first entry specifies various information about a ML model stored, e.g., in database 104 (or remotely from AI provider system 100). In this example, the entry has a "description" of "Lung Cancer Risk AI," which suggests it is a ML model that is trained to receive, as input, various clinical parameters associated with a patient (e.g., vital signs, digital images of the lungs, CT scans, magnetic resonance imaging ("MRI") data, demographic data, symptoms, medications, etc.), and to generate output indicative of a risk of lung cancer. The entry has a "version" of "1.0.1," a "date deployed" of May 3, 2018, a licensee name, a license expiration date, a "date retained" (which in this case is N/A because the ML model is still in its original form), compatible hardware, and compatible software (e.g., software that is configured to apply input data across the model).

In various implementations, when a user such as a doctor or nurse operates software to cause input data to be applied across this model, the user's digital key (e.g., 226) may, in addition to being applied across FFNN 220, also be checked against lookup table 334. If the user has sufficient permissions, the license is not expired, and the other criteria specified by the entry are met, then the user may be permitted to apply input across the ML model. In some implementations, the entry may be updated (logged) to reflect that the ML model has been used, e.g., by the specific user at a particular time. If the license stipulates a limited number of applications of the ML model, then the current use may be applied towards that limit.

Figure 4:
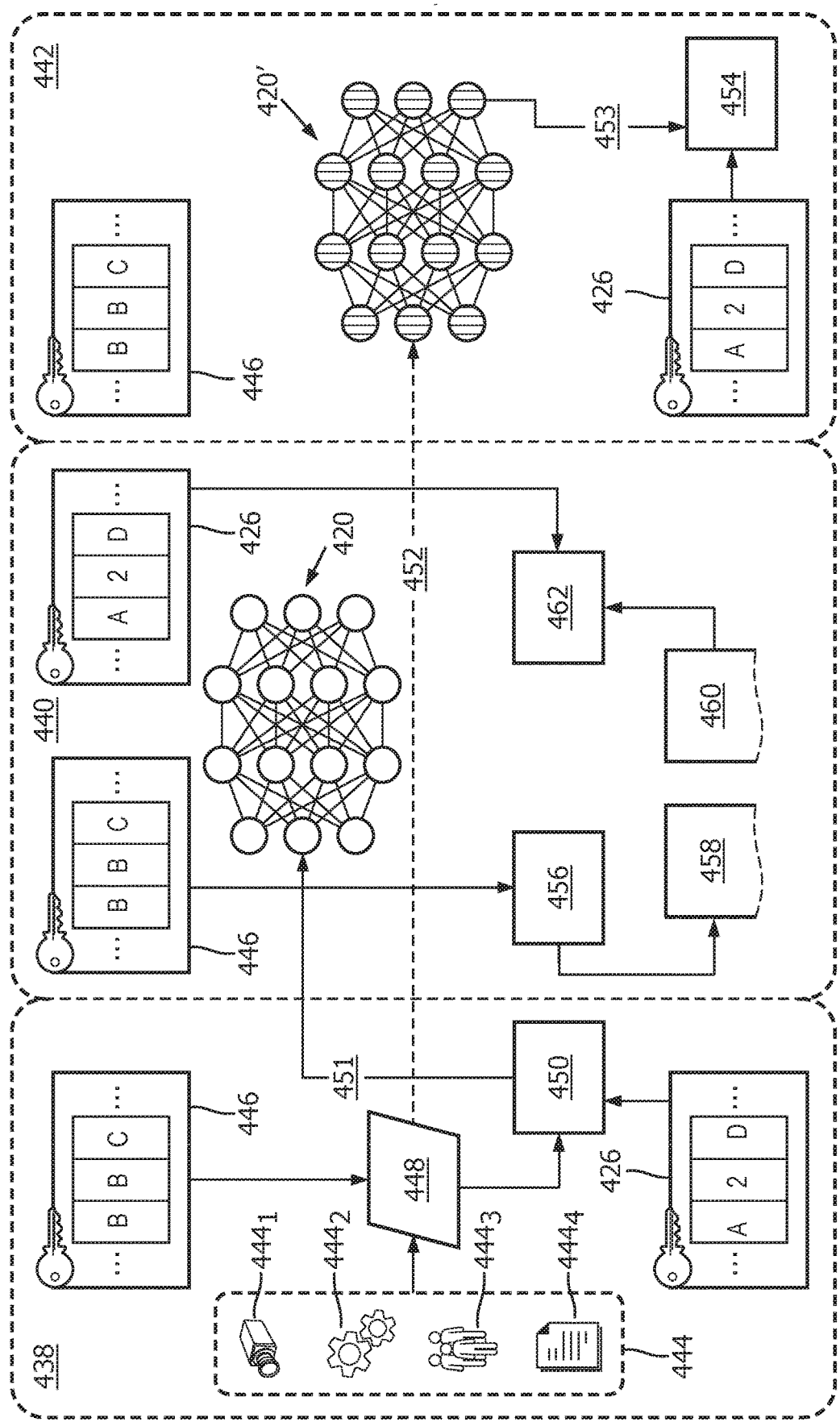
FIG. 4 depicts another example of how the integrity of a machine learning model may be verified, and also how the model may be protected from attack, in accordance with various embodiments.

In some embodiments, various data associated with use of a ML model may be encrypted at various stages in order to verify the model's integrity and/or to authenticate use of the ML model. In FIG. 4, for instance, there are three stages of application of a ML model depicted schematically: input stage 438, encryption of the ML model and weights in non-volatile memory stage 440, and output stage 442.

In input stage 438, input data may be received/obtained/retrieved from a variety of sources 444. These sources may include, but are not limited to, image data $444_1$ obtained from medical imaging devices such as X-rays, CT scans, MRIs, EKG, etc., imaging protocol data $444_2$ (e.g., digital imaging and communications in medicine, or "DICOM," picture archiving and communication systems, or "PACS," etc.), demographic data 4443, and medical history data $444_4$ (e.g., obtained from EHRs). Other sources of input data are also contemplated herein.

Before or during input stage 438, an encryption key 446 may be provided, e.g., by AI provider system 100 to one or more remote computing systems 102 (see FIG. 1). This encryption key 446 may be used by one or more users (114 in FIG. 1) to generate, from data provided by sources 444, encrypted data 448. When the time comes to apply the encrypted input data 448 across one or more ML models, such as FFNN 420 (which may be similar to or different from 220 in FIG. 2), various actions may be taken.

In some embodiments, a unique private digital key 426 (which may be similar to digital key 226) may be used at block 450 to decrypt the decrypted data 448, e.g., so that the decrypted data can then be applied as input across an unencrypted version of FFNN 420 (as shown at 451). Up until this time, however, the input data may remain in its encrypted form 448. In these embodiments, encrypting the input data up until its use (e.g., until it is loaded into volatile memory) provides at least some security against unauthorized parties obtaining access to the potentially sensitive data. For example, some hackers may be opportunists that, when confronted with encrypted input data (i.e. while awaiting application across FFNN 420), may look elsewhere for data to exploit.

Additionally or alternatively, in some embodiments, in output stage 442 (on the right in FIG. 4), encrypted input data 448 may remain encrypted, and may be employed as encrypted input 452 across an encrypted version of FFNN 420'. In various embodiments, encrypted FFNN 220' (indicated with the shading) may be generated, e.g., using encryption key 446 or another encryption key so that it only accepts encrypted data; unencrypted input may lead to erroneous output. Various types of encryptions may be used, such as RSA or other forms mentioned earlier. In some embodiments, encrypted FFNN 420' may be generated using homomorphic encryption, which as noted previously is a mechanism by which mathematical operations such as those associated with encrypted FFNN 420' can be applied to encrypted data to generate encrypted output 453. Encrypted FFNN 420' may remain encrypted even when loaded into volatile memory for use. The encrypted output 453 can then be decrypted, e.g., using digital key 426, to yield decrypted output 454, which may constitute actual valid results due to the homomorphic nature of the encryption. Additionally or alternatively, in some embodiments, garbled circuits may be employed.

In some embodiments, in the encryption of ML model 420 and weights in non-volatile memory stage 440 (in the middle of FIG. 4), encryption key 446 may be used at 456 to encrypt parameters and weights associated with FFNN 420 to generate encrypted model file 458 and encrypted weights file 460. Various encryption techniques may be employed, such as RSA or others mentioned previously. Later, e.g., when decrypted or encrypted input data is about to be applied across FFNN 420, digital key 426 (or another digital key) may be used at block 462 to decrypt encrypted model file 458 and encrypted weights file 460. This may occur, for instance, when FFNN 420 is loaded into volatile memory (e.g., of AI provider system 100 or remote computing system 102) for use. Thus, while FFNN 420 is stored in non-volatile memory (e.g., disk, solid state memory, etc.), it may remain encrypted and hence protected at least somewhat from malicious users. It is only when FFNN 420 is to be used and is loaded into volatile memory (e.g., RAM) that it is decrypted (e.g., at block 462 using digital key 426).

One benefit of the various encryption schemes depicted in FIG. 4 is that unauthorized use of FNN 420 or its encrypted version 420' may be prevented. As noted previously, in some embodiments, only encrypted input can be applied across FFNN 420/420'—unencrypted data will result in erroneous output. Consequently, a user who wishes to use FFNN 420/420' must have access to one or more digital keys (e.g., 426) and/or decryption keys (e.g., 446). Without these keys, an unauthorized user may not be able to utilize FFNN 420/420'.

Figure 5:
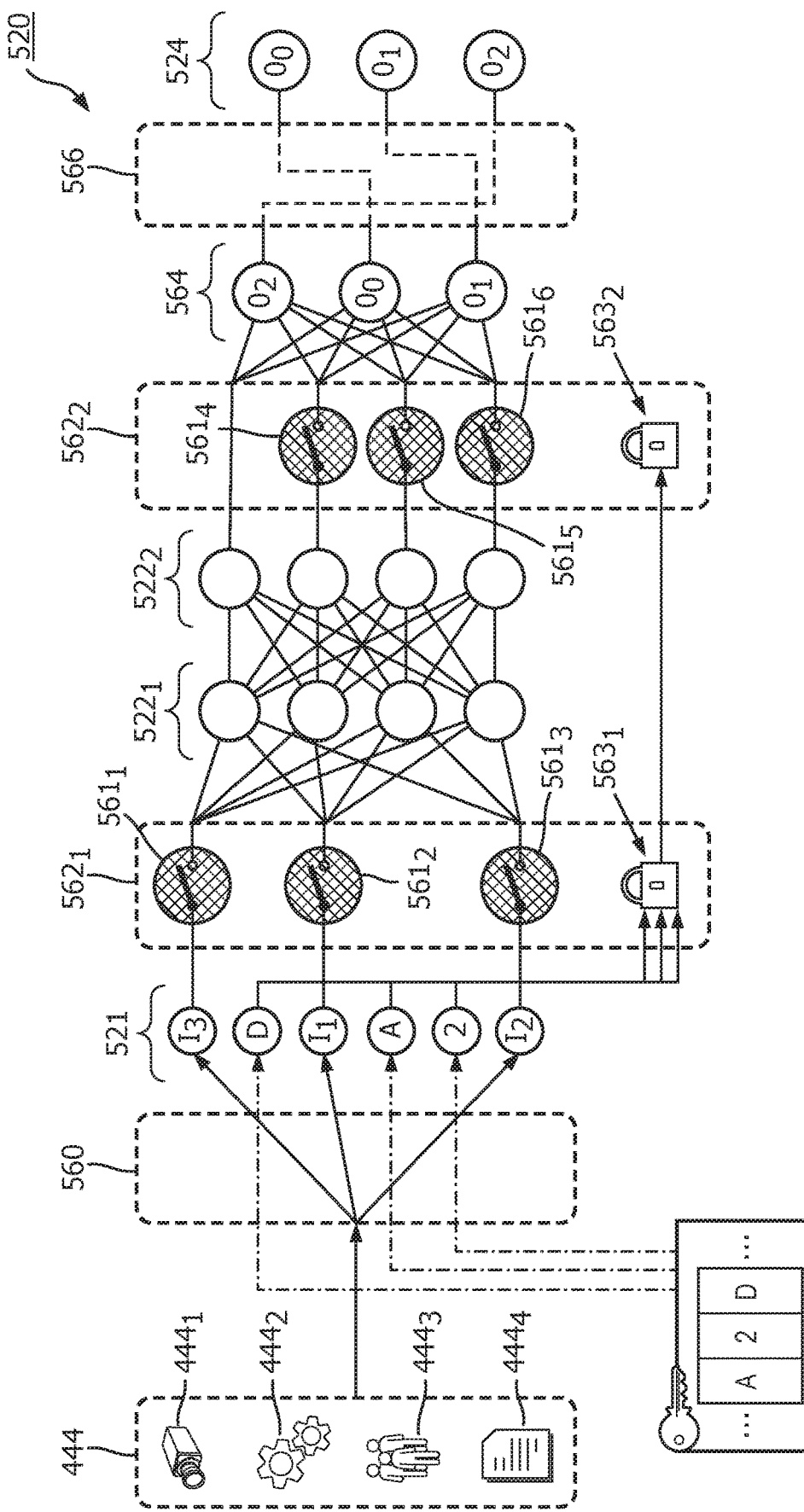
FIG. 5 depicts an example of how the integrity of a machine learning model may be protected while also facilitating authentication of access to the model, in accordance with various embodiments.

FIG. 5 depicts an example of how the integrity of a trained machine learning model may be protected while also facilitating authentication of access to the model, in accordance with various embodiments. In FIG. 5, a ML model once again takes the form of a FFNN 520, although this is not meant to be limiting. In FIG. 5, FFNN 520 may produce meaningful and/or coherent output only when an appropriate credential or other piece of data, such as digital key 526 (which may be similar to 226, 426) is provided, e.g., as input across at least a portion of FFNN 520. Otherwise, application of input data across FFNN 520 may generate erroneous output, all zeroes, output that signifies unauthorized use of FFNN 520, and/or output that indicates whether FFNN 520 has been compromised somehow.

In FIG. 5, various inputs may be obtained from the same or similar sources 444 as were depicted in FIG. 4. An input scrambler 560 may be configured to scramble the input data obtained from sources 444, alone or in combination with data obtained from digital key 526, such that data output from input scrambler 560 includes data from digital key 526 that is shuffled or intermixed with input data obtained from sources 444. For example, and as indicated by the dashed lines underlying input scrambler 560, the inputs from sources 444 and data from digital key 526 are interspersed among nodes of an input layer 521, such that input layer 521 comprises scrambled input. Additionally or alternatively, the input data may be scrambled by modulating their amplitudes, e.g., adding or subtracting a constant value to/from each individual input stream. In some such embodiments, the scrambled input sequence may only be known to the manufacturer of the algorithm, and may have been configured at the time of algorithm's creation. The user will only be able to use to algorithm if they are provided with the input scrambling module either alone or in combination with data obtained from digital key 526 that would serve to enable to scrambling operation.

In various embodiments, one or more "gated" layers 562 may be provided, e.g., between other layers of FFNN 520. These gated layers 562 may be operable to allow or block forward propagation of data through various portions of FFNN 520. Two gated layers, $562_1$ and $562_2$, are depicted in FIG. 5, but more or less may be deployed in various embodiments. These gated layers 562 may be transitionable between "locked" and "unlocked" states as described below. For example, in first gated layer $562_1$, three gate nodes, $561_{1-3}$, are coupled with three of the six outputs of scrambled input layer 560. The other nodes of input layer 521 are not connected to gate nodes 561, though this is not meant to be limiting. More or less gate nodes 561 may be included in a given gated layer 562. Outputs of gate nodes $561_{1-3}$ are coupled with inputs of a first hidden layer $522_1$. Although two hidden layers, $522_1$ and $522_2$, are depicted in FIG. 5, this is not meant to be limiting. More or less hidden layers may be provided. In some embodiments, the gated layers may be inserted into the model post-training and used primarily during inference to control the flow of data through the model.

Gated nodes $561_{1-3}$ of gated layer $562_1$ may be opened or closed by a first key lock routine $563_1$. First key lock routine $563_1$, which may take various forms, such as software including one or more an if/else statements, a hash function, etc., may be coupled with input nodes of input layer 521 that include data from digital key 526. If a proper and/or authorized digital key 526 is provided, first key lock routine $563_1$ may unlock or open gate nodes $561_{1-3}$, e.g., by setting them to one (unlocked). Otherwise, first key lock routine $563_1$ may lock or close gate nodes $561_{1-3}$, e.g., by setting them to zero. In some embodiments, a second gated layer $562_2$ may be provided with its own gate nodes $561_{4-6}$, as well as a second key lock routine $563_2$ that may or may not be activated by output of first key lock routine $563_1$.

In some embodiments, a data descrambler 566 may also be provided. As shown by the underlying dashed lines, data descrambler 566 may be configured to descramble (or "unshuffled") output of second hidden layer $522_2$. For example, in FIG. 5, outputs $O_2$, $O_0$, and $O_1$ are descrambled to $O_0$, $O_1$, and $O_2$ in a final output layer 524.

Gated layers 562 provide for a variety of benefits relating to, for instance, authentication. If inserted as entire layers as depicted in FIG. 5, it is possible to easily insert gated layers 562 into an ML model post-training, as demonstrated by FIGS. 10A-B. Moreover, the gated layers 562 may be customizable for individual licensees.

Figures 10A, 10B:
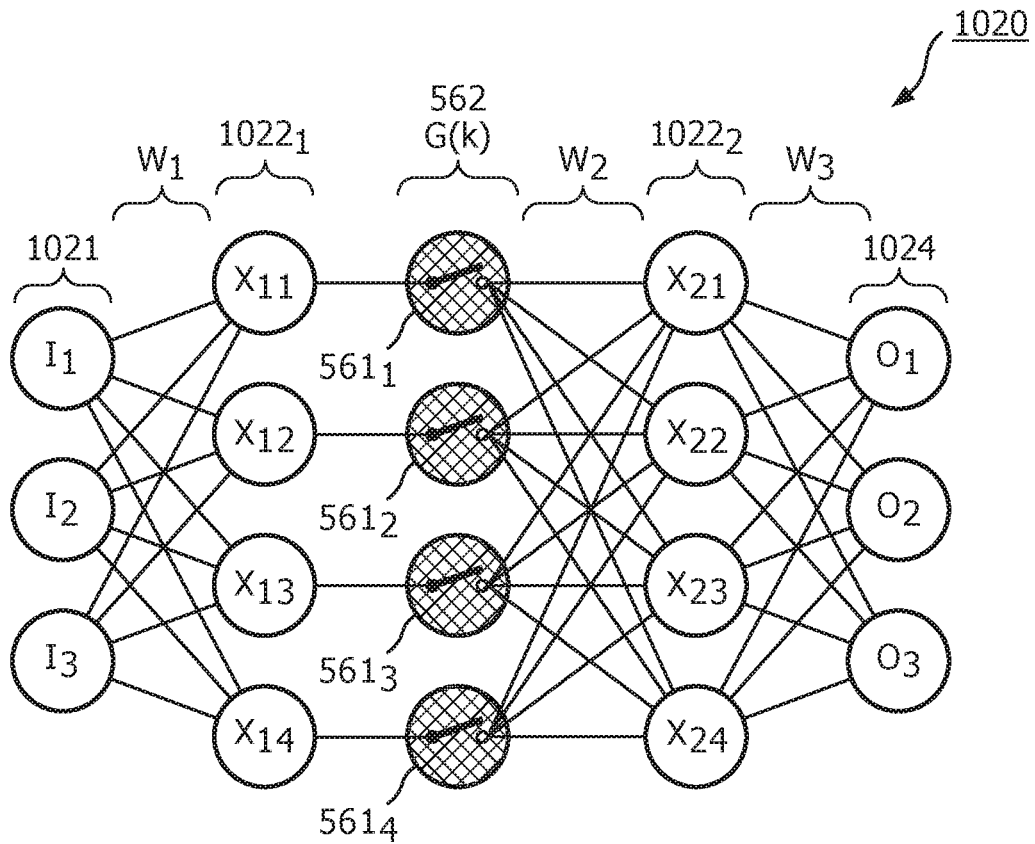
FIGS. 10A and 10B demonstrate one example of how the embodiment of FIG. 5 may be facilitated, in accordance with various embodiments.

FIGS. 10A-B demonstrate how the gated layers 562 may be inserted into a FFNN 1020 post-training with relative ease. FFNN 1020 may be similar to FFNN 520 in many respects. Once inserted, gated layers 562 may then be used primarily during inference to control the flow of data through the model. In some implementations, a routine such as that depicted in FIG. 10B (pseudocode resembling python) may be employed when gated layers 562 are inserted into FFNN 1020.

In FIG. 10B, k represents a digital key, e.g., 526. $h_i$ designates a particular hidden layer, $1022_i$. In FIG. 10A there are three sets of weights, $W_{1-3}$. The first set of weights $W_1$ is between the input layer $102_1$ and the first hidden layer $1022_1$. The second set of weights $W_2$ is between the gated layer 562 and the second hidden layer $1022_2$. The third set of weights $W_3$ is between the second hidden layer $1022_1$ and the output layer 1024. Back in FIG. 10B, the activation function at top, may be, for instance, a sigmoid function that introduces nonlinearity into FFNN 1020. As explained in the comments in FIG. 10B (prefaced by the "#" sign), if a valid digital key k is applied, G(k) will equal one, which means the output from first hidden layer $1022_1$ is propagated unaltered to second hidden layer $1022_2$. On the other hand, if an invalid (or no) digital key k is applied, G(k) will equal zero, which means the output from first hidden layer $1022_1$ is essentially replaced with zeros that are propagated to second hidden layer $1022_2$. Thus, output provided by output layer 1024 will be nonsensical or simply zero. In some embodiments, this may be accomplished by adding a column of zeros to a matrix and/or by replacing a column of a matrix with zeros.

FIGS. 5 and 10 demonstrate how gated layers may be inserted into post-trained feed-forward neural networks. And as will be described below, FIGS. 6 and 11 demonstrated how individual gated nodes may be inserted into pre-trained feed-forward neural networks. However, techniques for inserted gated layers or individual gate nodes are not so limited. For example, gated layer techniques described herein may be used to wrap any type of machine learning model by inserting a gated layer before or after the input layer and/or output layer of the model. Furthermore, a gated layer (or individual gate node) may be embedded within many types of machine learning models that include a multi-step calculation or process, as will be described in FIGS. 12-14. For example, a gated layer may be inserted at any given level in a decision tree, or between the joint and conditional probabilities in a naïve Bayes calculation. Both approaches are particularly suitable for "ensemble" machine learning models and can be used to limit or direct flow of information through these types of modeling approaches, as shown, for instance, in FIG. 13. The technique applies to both supervised and unsupervised models, as well as regression and classification models.

Figure 6:
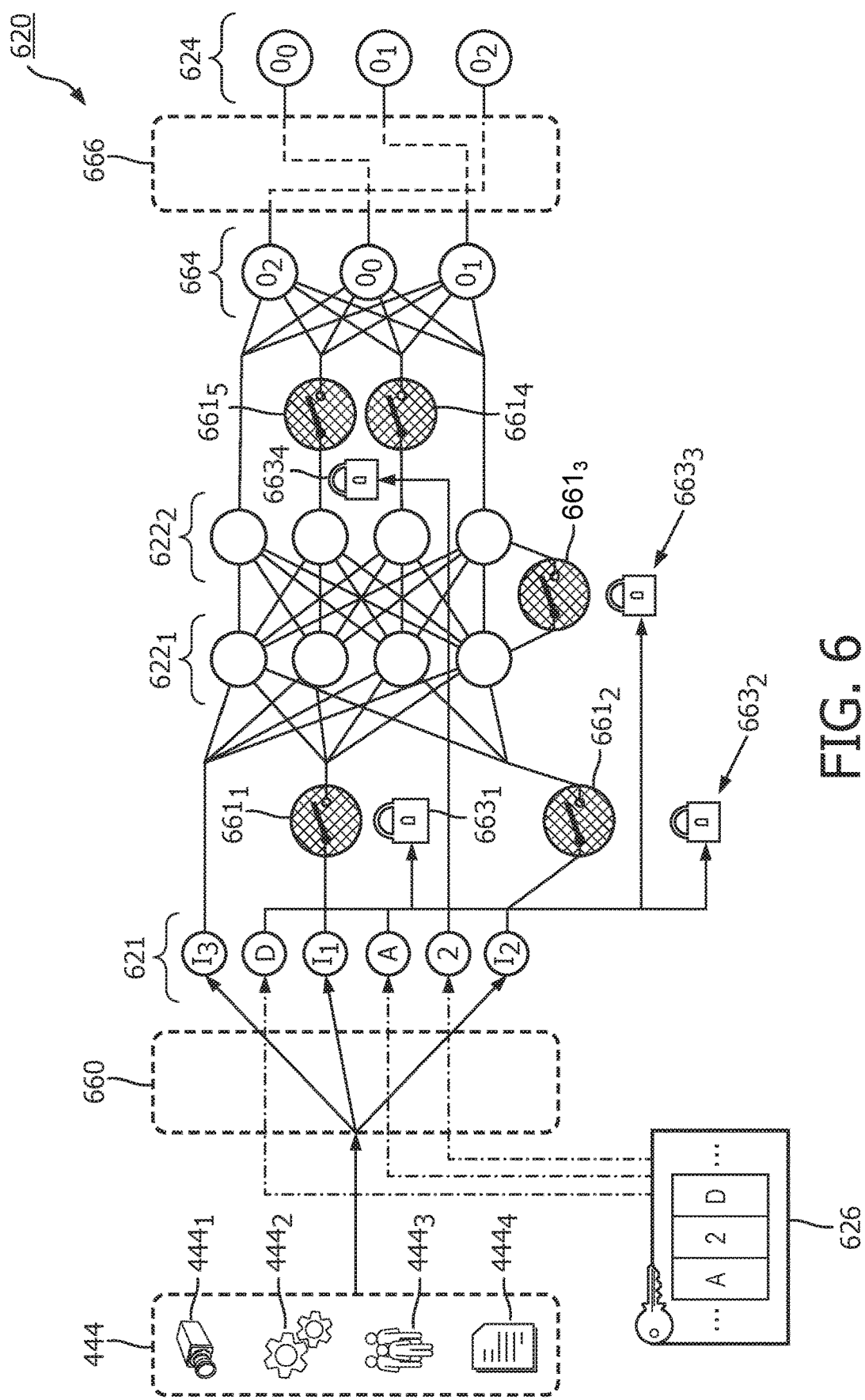
FIG. 6 depicts another example of how the integrity of a machine learning model may be protected while also facilitating authentication of access to the model, in accordance with various embodiments.

FIG. 6 depicts an embodiment that is similar in many ways to that of FIG. 5, but that introduces additional advantages. In FIG. 6, the trained ML model once again takes the form of an FFNN 620 that includes an input layer 621, two or more hidden layers $622_1$-$622_2$, and an output layer 624. As noted previously, more or less layers, including hidden layers, may be provided, and the trained ML model may take other forms. Also present once again are a scrambler 660 and a descrambler 666 that may operate similarly to components 560 and 566 in FIG. 5.

In this example, rather than including entire gated layers (562 in FIG. 5), individual gate nodes $663_{1-4}$ are interspersed at various points within FFNN 620. For example a first gate node $661_1$ couples the output from an input node ("$I_1$") with an input of a node of first hidden layer $622_1$, and is controlled by a first key lock routine $663_1$. First gate node $661_1$ is controlled by a first gate lock routine $663_1$, which itself is coupled with the portions of input layer 621 that include data from digital key 626. Similarly, a second gate node $661_2$ couples the output from another input node ("$I_2$") with another input node of first hidden layer $622_1$. Second gate node $661_2$ is controlled by a second gate lock routine $663_2$, which itself is, like first gate lock routine $663_1$, coupled with the portions of input layer 621 that include data from digital key 626.

A third gate node $661_3$ is coupled between the output of one node in first hidden layer $622_1$ and to the input of a node of second hidden layer $622_2$. Like first and second gate nodes $661_{1-2}$, third gate node $661_3$ is controlled by a third gate lock routine $663_3$. Third gate lock routine $663_3$ is once again coupled with, and hence controlled by, the portions of input layer 621 that include data from digital key 626.

Fourth and fifth gate nodes $661_{4-5}$ are coupled between, on one side, two nodes of second hidden layer $622_2$, and on the other side, nodes of scrambled output layer 664. Both of these gate nodes $661_{4-5}$ are controlled by a single, fourth gate lock routine $663_4$. Like the previous gate lock routines $663_{1-3}$, fourth gate lock routine $663_4$ is coupled to, and therefore controlled by, the portions of input layer 621 that include data from digital key 626.

With gate lock routines 663 and gate nodes 661 interspersed at various locations throughout FFNN 620, it is possible to facilitate multiple levels of authentication depending on the digital key 626 provided as input. For example, in FIG. 6, input from sources 444 is provided, along with data from digital key 626, to data scrambler 660. Data scrambler 660 scrambles these data as described previously to generate scrambled input layer 621. Even with the scrambling, data from digital key 626 is provided as input to gate lock routines $663_{1-4}$. These gate lock routines 663 may be configured (e.g., trained) to unlock and/or lock gate nodes $661_{1-5}$ so that selected portions of the actual input data ("$I_0$," $I_1$," and "$I_2$" in scrambled input layer 621) from sources 444 are accurately provided, or inaccurately provided, to downstream components of FFNN 620. Consequently, a first digital key 626 provided by a user with relatively limited access may only unlock one or two selected gate nodes 661. By contrast, a second digital key provided by another user with relatively unlimited access may unlock, or most, of all gate nodes $661_{1-5}$.

As a non-limiting example, suppose FFNN 620 is a convolutional neural network that receives, as input, a digital image of a patient. As noted above, privacy is tantamount for many healthcare applications. Accordingly, different digital keys may be provided to different users depending on the users' relative levels of access, so that the convolutional neural network only processes portions of those images to which the respective users are entitled to access. For example, a user with limited permissions such as a nurse or a researcher using FFNN 620 to analyze image data in an anonymous manner may provide a digital key 626 that unlocks only those portions of the convolutional neural network (sometimes referred to as "image patches") that do not depict a patient's face. Higher level users, such as doctors caring for the patients depicted in the input data, may provide digital keys 626 that unlock other portions of the input images, such as portions depicting the patients' faces.

In some embodiments, a similar process may also be performed at the output level, where, for instance, the digital keys 626 may unlock a desired level of output. For example, a nurse, researcher, or doctor classifying an image using FFNN 620 may receive output that provides a decision support appropriate for their level of expertise. A nurse or researcher may have a global output such as an indication that the patient has suspicious lung nodules. By contrast, a doctor treating the patient might receive the location(s) and risk(s) of malignancy of the individual nodules, i.e. more granular output.

In another similar application, suppose the convolutional neural network is designed to analyze images captured of passengers at a security checkpoint of an airport. Digital keys provided by low level security agents may only unlock portions of FFNN 620 that correspond to image patches corresponding to certain areas of the passengers' bodies. By contrast, digital keys provided by high level security agents or investigators, e.g., as part of an investigation after a security breach, may unlock most, if not all, of FFNN 620, so that they are able to perform additional functions unavailable to the low level security agents, such as facial recognition.

Locations of FFNN 620 at which gate nodes 661 are inserted may be selected in various ways. In some embodiments, the locations may be selected randomly or quasi-randomly. In other embodiments, the locations may be selected based on the relative influence other nodes at or near those locations may have on the ultimate output. For example, particular nodes of a hidden layer 622 and/or pairs of respective nodes between hidden layers may more heavily influence the ultimately output than others. In some embodiments, these highly-influential node pairs may be coupled with a gate node such that locking the gate node will render output of the model nonsensical, not useful, etc. Additionally or alternatively, and as noted above, in some embodiments, gate nodes (or gated layers) may be inserted at locations within a convolutional neural network that control which regions of input digital image are processed, classified, etc. Consequently, these inserted gate nodes (or layers) can be operated by digital keys that indicate what level of access a user should have.

Figures 11A, 11B:
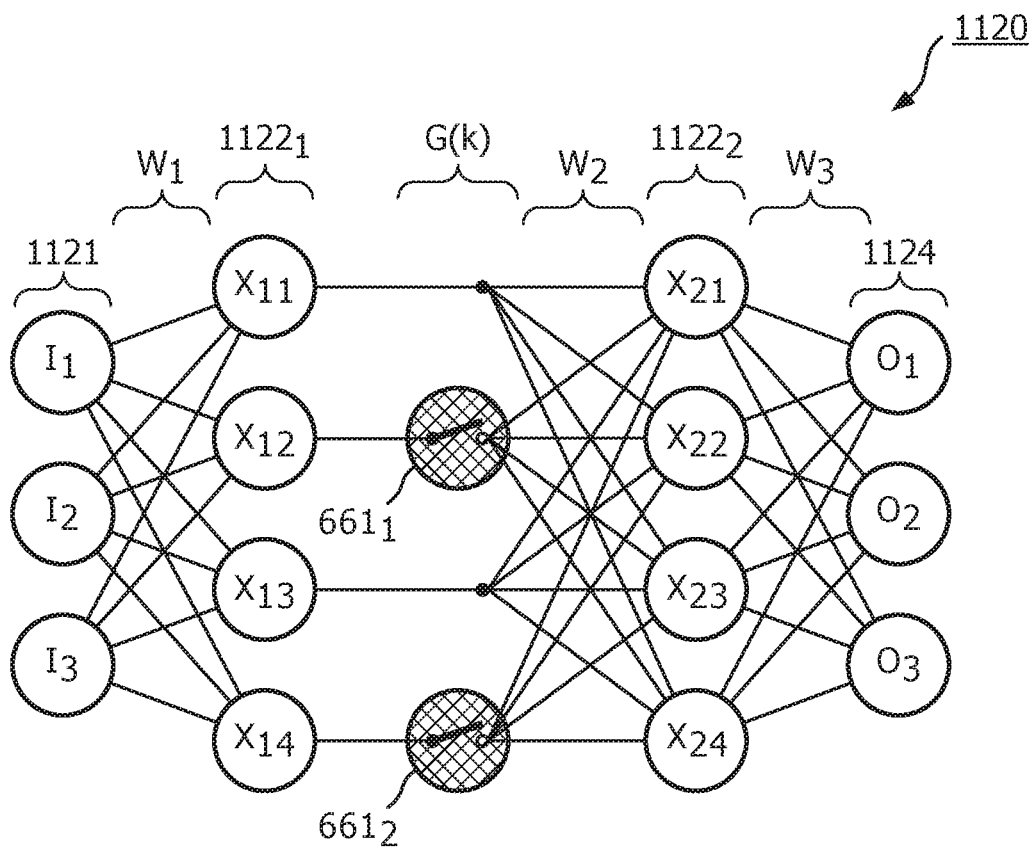
FIGS. 11A and 11B demonstrate one example of how the embodiment of FIG. 6 may be facilitated, in accordance with various embodiments.

FIGS. 11A-B demonstrate how the gate nodes 661 may be inserted into a FFNN 1120 post-training with relative ease. FFNN 1120 may be similar to FFNN 620 in many respects. Once inserted, gate nodes 661 may then be used primarily during inference to control the flow of data through the model. In some implementations, a routine such as that depicted in FIG. 11B (pseudocode resembling python) may be employed when gate nodes 661 are inserted into FFNN 1120.

In FIG. 11B, which is similar to FIG. 10B, k once again represents a digital key, e.g., 626. $h_i$ designates a particular hidden layer, $1122_i$. In FIG. 11A there are once again three sets of weights, $W_{1-3}$. The first set of weights $W_1$ is between the input layer 1121 and the first hidden layer $1122_1$. The second set of weights $W_2$ is between two gate nodes $561_{1-2}$ and the second hidden layer $1122_2$. Two nodes of the first hidden layer $1122_1$, $X_{11}$ and $X_{13}$, are not coupled with gate nodes. The third set of weights $W_3$ is between the second hidden layer $1122_1$ and the output layer 1124.

Back in FIG. 11B, the activation function at top, may be, for instance, a sigmoid function that introduces nonlinearity into FFNN 1120. As explained in the comments in FIG. 11B (prefaced by the "#" sign), if a valid digital key k is applied, G(k) will equal one for all gate nodes (i.e., X12 and X14), which means the output from nodes X12 and X14 in first hidden layer 11221 is propagated unaltered to second hidden layer 11222. For ungated nodes X11 and X13 of first hidden layer 11221 G(k) is always one. On the other hand, if an invalid (or no) digital key k is applied, G(k) for the gate nodes (X12 and X14) will equal zero, which means at least some of the output from first hidden layer 11221 is essentially replaced with zeros that are propagated to second hidden layer 11222. Thus, output provided by output layer 1124 will be nonsensical.

Figure 7:
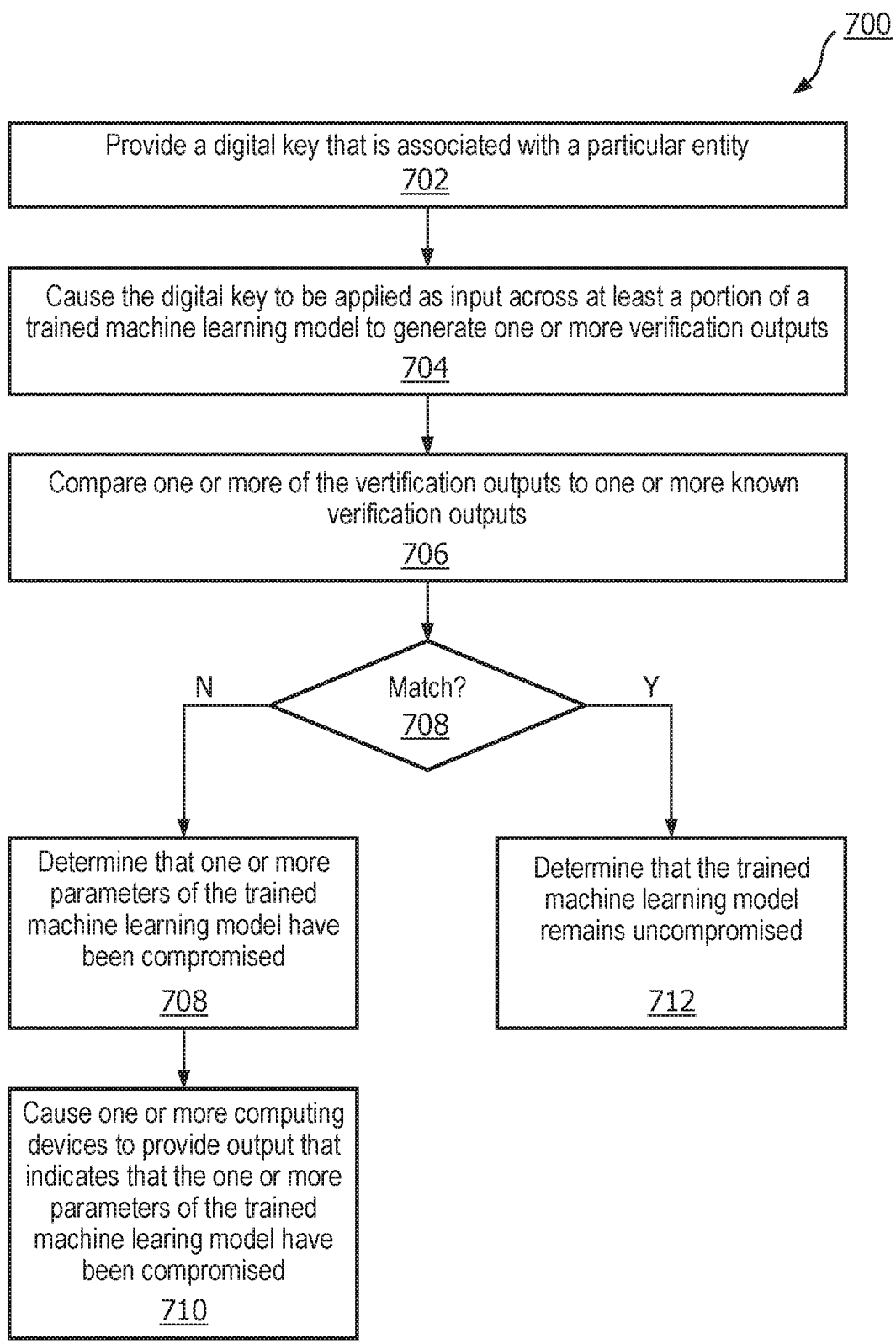
FIGS. 7, 8, and 9 depict example methods for practicing selected aspects of the present disclosure, in accordance with various embodiments.

FIG. 7 illustrates a flowchart of an example method 700 for practicing selected aspects of the present disclosure, including aspects demonstrated in FIG. 2. The operations of FIG. 7 can be performed by one or more processors, such as one or more processors of AI provider system 100 and/or one or more remote computing systems 102. For convenience, the operations of FIG. 7 will be described as being performed by a system. Other implementations may include additional steps than those illustrated in FIG. 7, may perform step(s) of FIG. 7 in a different order and/or in parallel, and/or may omit one or more of the steps of FIG. 7.

At block 702, the system may provide a digital key (e.g., 226, 426, 526, 626) that is associated with a particular entity. For example, AI provider system 100 may provide to its customers (e.g., users of remote computing systems 102) one or more digital keys that are unique to each customer/employee and/or to one or more ML models to which the customers have access.

At block 704, the system may cause the digital key to be applied as input across at least a portion of a trained machine learning model to generate one or more verification outputs. In various embodiments, the digital key may be applied by itself as input across at least a portion of the ML model, and/or it may be applied in conjunction with other inputs, such as data the customer wishes to make an inference about. In the former case, in some embodiments, the digital key may be applied immediately prior to any other use of the ML model, or at other times, such as periodically, on demand (e.g., upon suspicion of the ML model being compromised), at randomly selected times, and so forth. In various implementations, the digital key may be applied at an input layer (e.g., 221) of the model, and/or at other potential entry points of the model, such as at one or more hidden layers, output layers, softmax/sigmoid layers, etc.

At block 706, the system may compare one or more of the verification outputs to one or more known verification outputs. In various embodiments, the one or more known verification outputs may have been generated based on prior application of the digital key as input across at least the same portion of the trained machine learning model. Intuitively, if a ML model remains unaltered, then applying the same data across the same portion of the ML model at different times should yield the same output. Thus, in some embodiments, the comparing of block 706 seeks an exact match between the verification output(s) generated at block 704 and the known verification output(s). However, this is not meant to be limiting. In other embodiments, other types of comparisons may be performed. For example, the verification outputs generated at block 704 may be applied as input to a hash function, and the result may be compared to another hash or value used as a proxy for, or generated from, known verification output(s).

At block 708, the system may determine an outcome of the comparing at block 706. If the answer at block 708 is no, indicating that there is a no match, then at block 710, the system may determine that one or more parameters of the trained machine learning model have been compromised. For example, the verification output generated at block 704 may not precisely match the known verification outputs. One possible cause is that one or more parameters of the ML model have been tampered with, resulting in the disparity between the verification outputs generated at block 704 and the known verification outputs.

At block 710, the system may cause one or more computing devices to provide output that indicates that the one or more parameters of the trained machine learning model have been compromised. For example, AI provider system 100 may raise one or more audible or visual alarms, e.g., to local users who are employees of an entity that provides AI provider system 100. Additionally or alternatively, in some embodiments, one or more alarms may be raised at one or more remote computing systems 102, e.g., to notify end users (e.g., 114) that the model they have access to may no longer be reliable or dependable. In some embodiments, access to the ML model may be limited to eliminated until the model's integrity can be reestablished, e.g., by retraining the model and/or by providing a replacement model.

Back at block 708, if the answer is yes, indicating that there is a match, then at block 712, the system may determine that the trained ML model remains uncompromised. In some embodiments, no further action may be taken. In other embodiments, the successful integrity check may be logged, e.g., so that future investigators are able to determine that, at least at one point in time, the ML model was not compromised. This may help them determine when the ML model later become compromised, should that occur.

Figure 8:
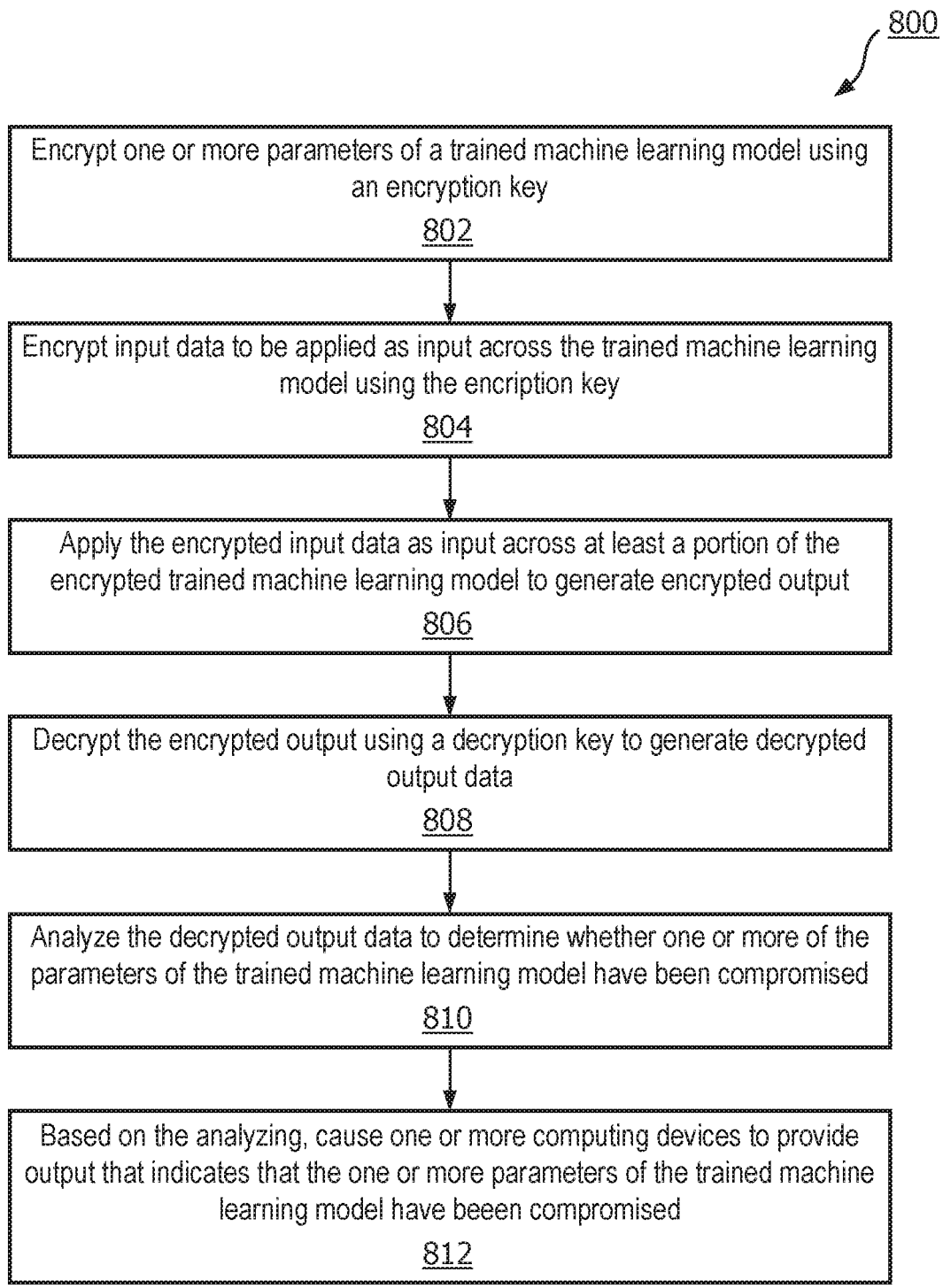

FIG. 8 illustrates a flowchart of an example method 800 for practicing selected aspects of the present disclosure, including aspects demonstrated in FIG. 4. The operations of FIG. 8 can be performed by one or more processors, such as one or more processors of AI provider system 100 and/or one or more remote computing systems 102. For convenience, the operations of FIG. 8 will be described as being performed by a system. Other implementations may include additional steps than those illustrated in FIG. 8, may perform step(s) of FIG. 8 in a different order and/or in parallel, and/or may omit one or more of the steps of FIG. 8.

At block 802, the system (e.g., remote computing device 102, or AI provider system 100 prior to sending the model to remote computing device 102) may encrypt one or more parameters of a trained machine learning model (e.g., 420) using an encryption key, e.g., 446, to generate an at least partially (if not entirely) encrypted model (e.g., 420'). This may be similar to operation 456 in FIG. 4. Various types of encryptions may be employed at block 802, such as homomorphic encryption, etc.

At block 804, the system may encrypt input data to be applied as input across the trained machine learning model (e.g., 420'), e.g., using the same encryption key (446), to generate encrypted input data similar to 448 of FIG. 4. At block 806, the system may apply the encrypted input data (e.g., 448) as input across at least a portion of the encrypted trained machine learning model to generate encrypted output (e.g., 453).

At block 808, the system may decrypt the encrypted output using a decryption key (e.g., 426) to generate decrypted output data (e.g., 454). At block 810, the system may analyze the decrypted output data to determine whether one or more of the parameters of the trained machine learning model have been compromised. This analysis may take various forms. In some embodiments, the analysis may include determining whether the decrypted output data (e.g., 454) complies with an expected output structure. For example, one or more output values may be expected to be within a particular range, or may collectively be expected to add up to one. If these constraints are not satisfied by decrypted data 454, that may indicate that the model has been compromised. Based on the analyzing at block 810, at block 812, the system may cause one or more computing devices (e.g., 102) to provide output that indicates that the one or more parameters of the trained machine learning model have been compromised, similar to block 710 of FIG. 7.

Figure 9:
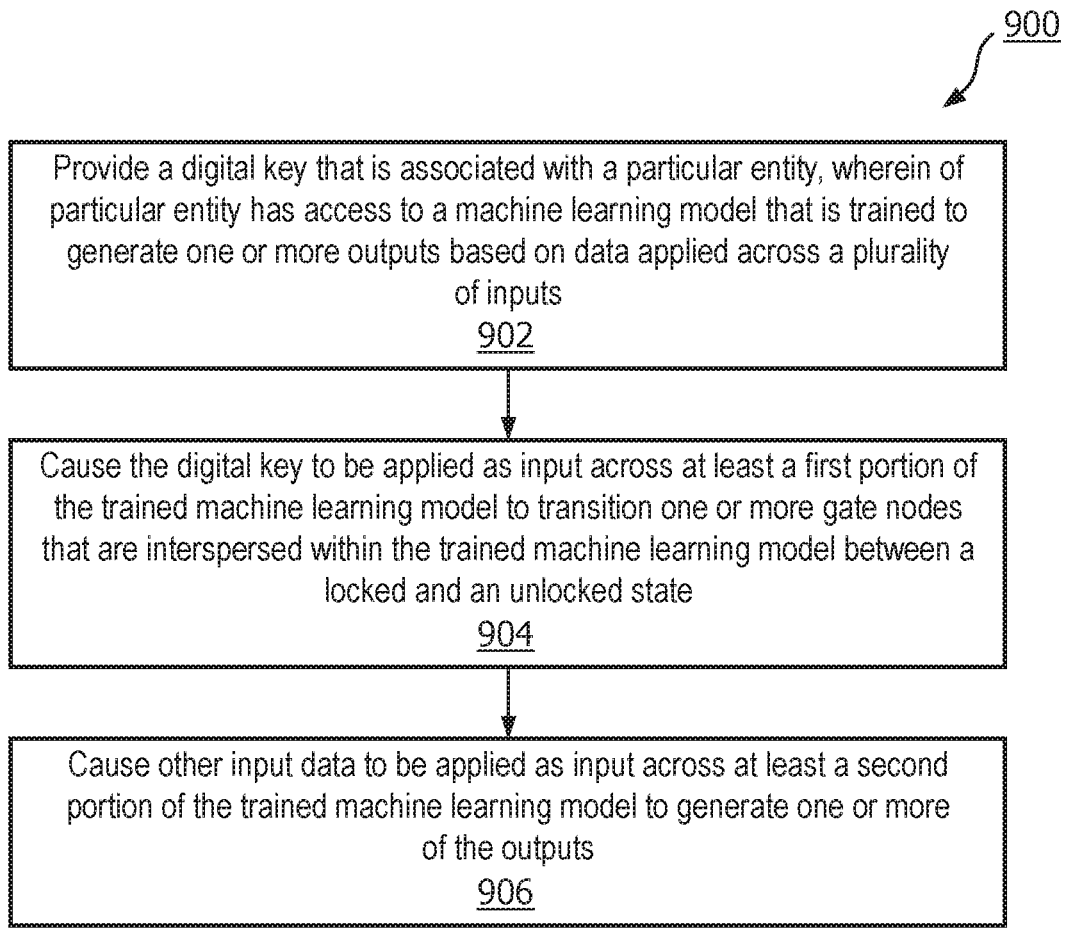

FIG. 9 illustrates a flowchart of an example method 900 for practicing selected aspects of the present disclosure, including aspects demonstrated in FIGS. 5 and/or 6. The operations of FIG. 9 can be performed by one or more processors, such as one or more processors of AI provider system 100 and/or one or more remote computing systems 102. For convenience, the operations of FIG. 9 will be described as being performed by a system. Other implementations may include additional steps than those illustrated in FIG. 9, may perform step(s) of FIG. 9 in a different order and/or in parallel, and/or may omit one or more of the steps of FIG. 9.

At block 902, the system may provide a digital key that is associated with a particular entity. In various embodiments, the particular entity may have access to a machine learning model, such as FFNN 220, 420, 520 or 620, that is trained to generate one or more outputs based on data applied across a plurality of inputs.

At block 904, the system may cause the digital key to be applied as input across at least a first portion of the trained machine learning model to transition one or more gate nodes (e.g., 561, 661) that are interspersed within the trained machine learning model between a locked and an unlocked state. For example, in FIG. 5, digital key 526 is applied (after scrambling) at the second, fourth, and fifth inputs of input layer 521. The same goes for FIG. 6. In FIG. 5, the data of digital key 526 is used to control first key lock routine $563_1$ (which controls gate nodes $561_{1-3}$), as well as second key lock routine $563_2$ (which controls gate nodes $561_{4-6}$). In FIG. 6, the data of digital key 626 is used to control first key lock routine $663_1$ (which controls first gate node $661_1$), second key lock routine $663_2$ (which controls second gate node $661_2$), third key lock routine $663_3$ (which controls third gate node $661_3$), and fourth key lock routine $663_4$ (which controls key nodes $661_{4-5}$).

At block 906, the system may cause other input data, such as inputs $I_{1-3}$ in FIGS. 5 and 6, to be applied as input across at least a second portion of the trained machine learning model to generate one or more of the outputs. For example, in FIG. 5, input data points $I_{1-3}$ are applied (after scrambling) at the first, third, and sixth inputs of input layer 521, respectively. The same goes for FIG. 6.

As described with respect to FIGS. 5-6, in various embodiments, when a gate node is in the unlocked state, it may allow data received from an upstream layer of the trained machine learning model to pass unaltered to a downstream layer of the trained machine learning model. For example, in the unlocked state, the gate node may multiply the data received from the upstream layer of the trained machine learning model by one. By contrast, in the locked state, the gate node may not allow (or prevent) the data received from the upstream layer of the trained machine learning model to pass unaltered to the downstream layer of the trained machine learning model. For example in the locked state, the gate node may multiply the data received from the upstream layer of the trained machine learning model by zero.

As described previously with respect to FIG. 5, in some embodiments, the one or more gate nodes may form a gated layer of gate nodes that is inserted between two layers of the trained machine learning model. In some such embodiments, the gate nodes of the gated layer may be transitioned between the unlocked and locked states by a single key lock routine that receives, as input, all or part of the digital key (e.g., 526, 626). And the entire digital key may not be used to lock/unlock all gate nodes. For example, in some embodiments, a first gate node may be transitioned between the locked and unlocked state by a first portion of a digital key. A second gate node may be transitioned between the locked and unlocked state by a second portion of the digital key that is different (or only partially intersects) the first portion of the digital key. And so on.

Figure 12A:
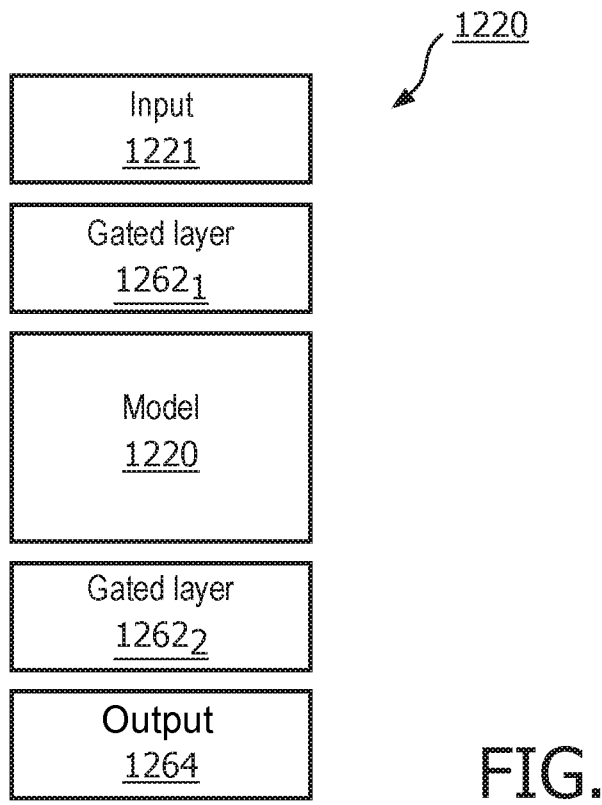
FIGS. 12A and 12B schematically demonstrate, in general terms, how gated layers and/or individual gate nodes may be inserted into trained machine learning models.
Figure 12B:
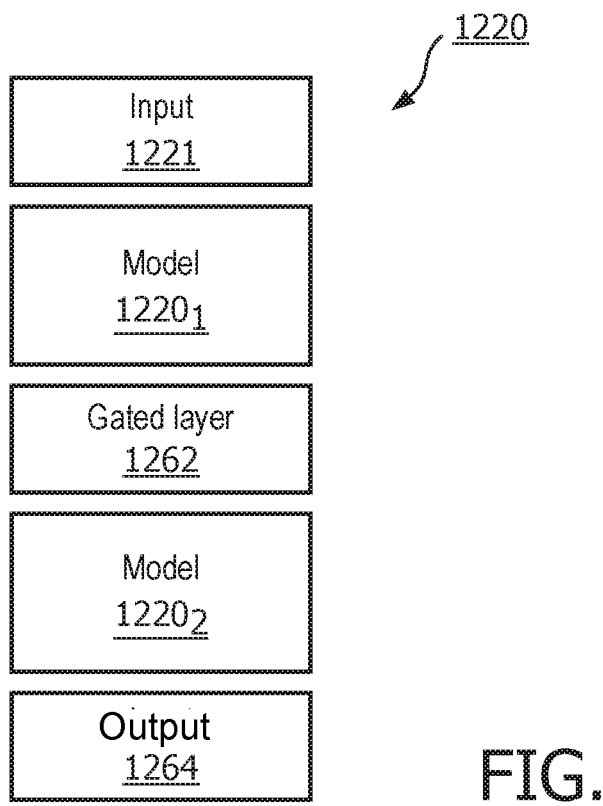

FIGS. 12A-B schematically demonstrate, in general terms, how gated layers and/or individual gate nodes may be inserted into trained machine learning models, including models other than neural networks (e.g., decision trees, support vector machines, random forests, k-nearest neighbors ("kNN"), Naïve Bayes, logistic regression, etc.). FIG. 12A demonstrates a "wrapper" approach in which one gated layer $1262_1$ is inserted between the input layer 1221 and the model 1220, and a second gated layer $1262_2$ is inserted between the model 1220 and an output layer 1264, similar to the arrangement depicted in FIG. 5. While gated layers $1262_{1-2}$ are depicted in FIG. 12A, this is not meant to be limiting; individual gate nodes may be inserted instead.

FIG. 12B depicts a different, "implanted" approach, more akin to that of FIG. 6, in which a gated layer 1262 (or individual gate node(s)) is implanted between layers of the model 1220, such that the model 1220 is split into two portions, $1220_1$ and $1220_2$, which are before, and after, the gated layer 1262, respectively. In some cases, the implanted approach may not work with some types of machine learning models, such as support vector machines or logistic regression models. Ensemble-based methods such as Ada Boost, stacking, bagging, etc. may also utilize the implanted approach of FIG. 12B.

Figure 13A:
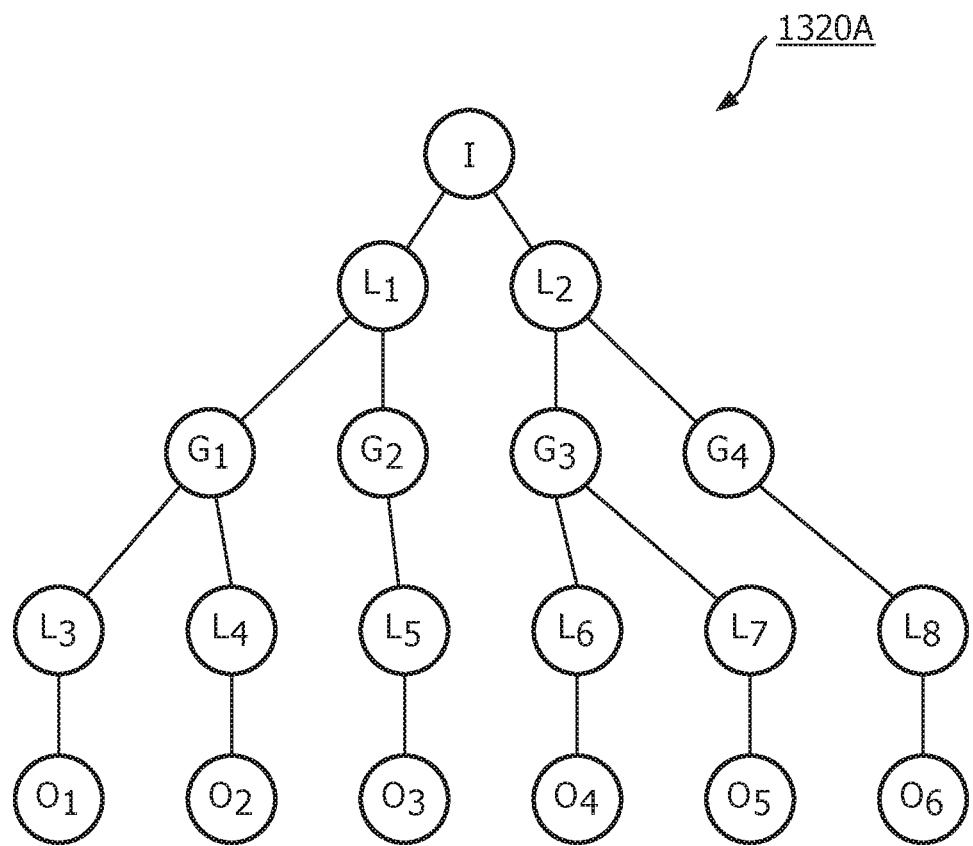
FIGS. 13A, 13B, and 13C depict examples of how techniques may be applied to various types of machine learning models that are different than feed forward neural networks.
Figure 13C:
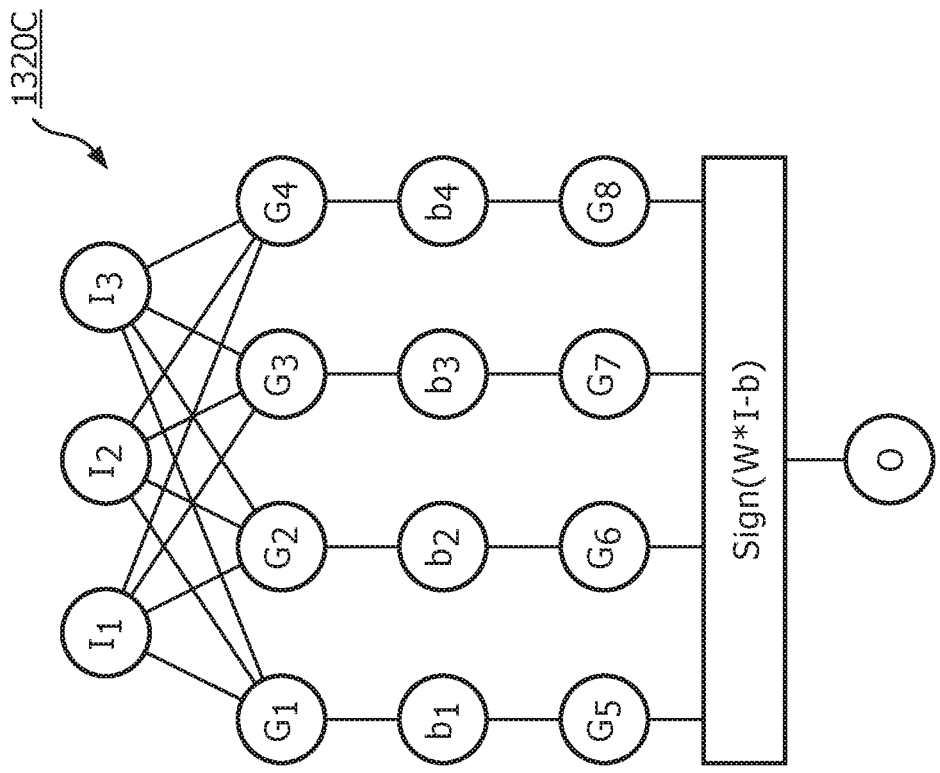
Figure 13B:
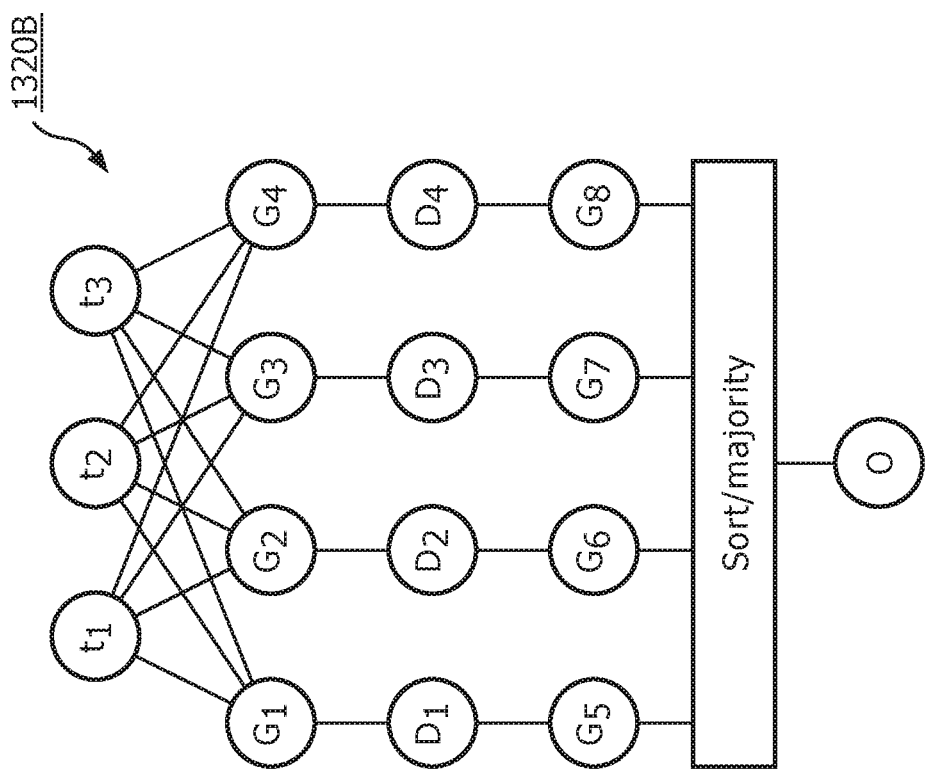

FIGS. 13A-C depict examples of how techniques may be applied to various types of machine learning models that are different than the feed forward neural networks described previously. FIG. 13A demonstrates one example of how a gated layer $G_{1-4}$ or individual gate nodes) may be inserted between levels $L_{1-2}$ and $L_{3-8}$ of a decision tree 1320A. The bottom layer comprises outputs $O_{1-6}$, and the top layer comprises input.

FIG. 13B demonstrates one example of how gated layers $G_{1-4}$ and $G_{5-8}$ may be inserted or implanted between inputs $t_{1-3}$ and distance-from-centroid layer $D_{1-4}$ of a kNN classifier 1320B, as well as between distance-from-centroid layer $D_{1-4}$ and a sorting/majority vote layer. FIG. 13C demonstrates one example of how gated layers $G_{1-4}$ and $G_{5-8}$ may be inserted or implanted between inputs $I_{1-3}$ and bias subtraction layer $b_{1-4}$ of a support vector machine 1320C, as well as between bias subtraction layer $b_{1-4}$ and a final activation layer (sign(W*I−b)).

While examples described herein have focused on intramodel insertion of gated layers and/or gate nodes, this is not meant to be limiting. Similar mechanisms may be employed between distinct, constituent models employed as part of a larger ensemble model in order to control which output data is generated and which output data is not generated (or at least not generated to be coherent). For example, output of a first trained model may be used as part of a first CDS algorithm to make one diagnosis, and may also be applied as input to a second model to make a second CDS diagnosis. If the customer only pays for a license to the first CDS algorithm, but not the second, then one or more gated layers and/or gate nodes may be inserted between the models to ensure that the licensee only receives content for which they have paid royalties.

Figure 14A:
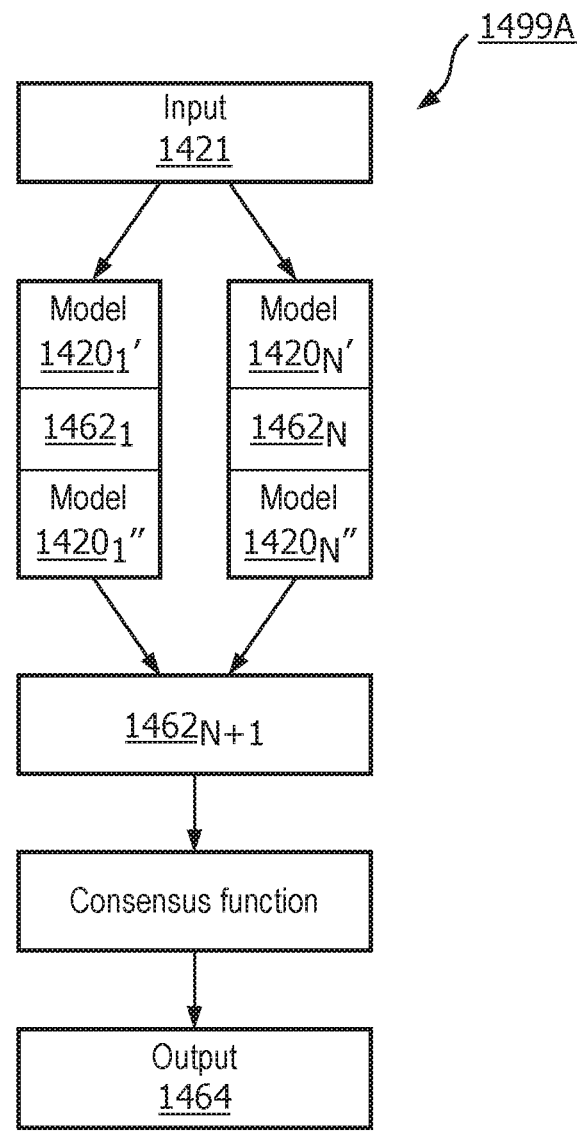
FIGS. 14A and 14B demonstrate examples of how gated layers and/or gate nodes may be implanted into ensemble-type models (e.g., processing pipelines that include multiple machine learning models).
Figure 14B:
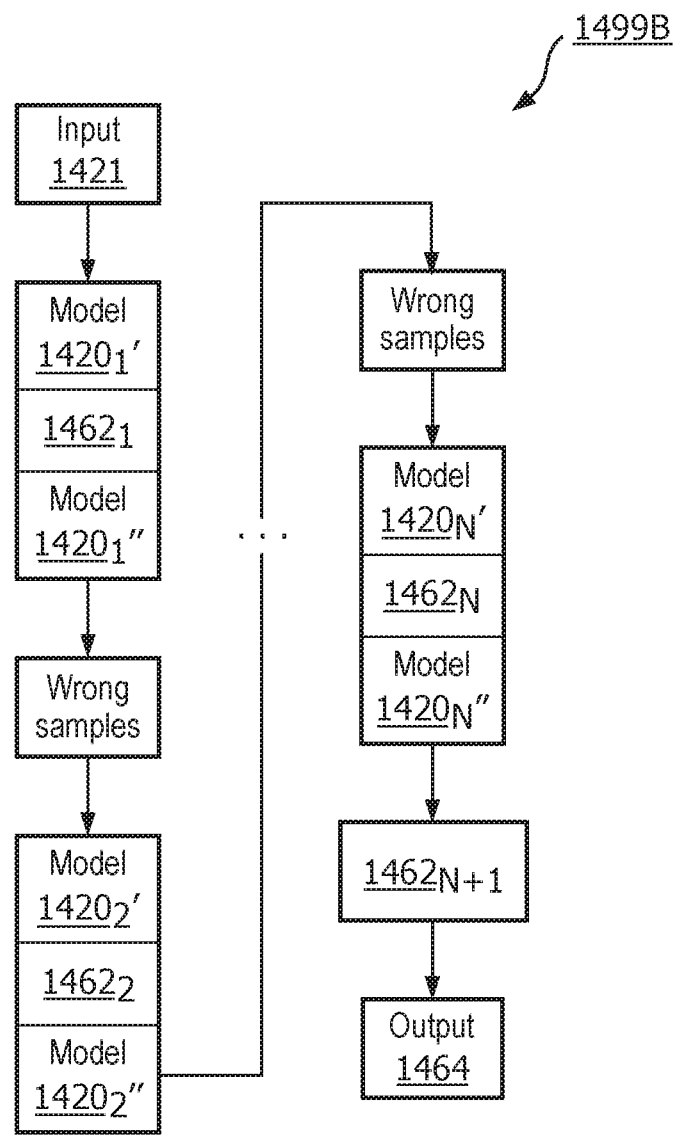

FIGS. 14A-B demonstrate examples of how gated layers and/or gate nodes may be implanted into ensemble-type models (e.g., processing pipelines that include multiple machine learning models). In FIG. 14A, an ensemble model 1499A comprises a "bagging" or "stacking" ensemble model that includes multiple constituent models $1420_{1-N}$ arranged in parallel to each other. Bagging ensemble models include multiple constituent models of the same model type. Stacking ensemble models include multiple constituent models of differing types. In this non-limiting example, a first model $1420_1$ is split into two parts, $1420_1'$ and $1420_1''$, with a gated layer $1462_1$ inserted therebetween. One or more additional models, including model $1420_N$, are split in a similar fashion. The output of these models is provided as input to another gated layer $1462_{N+1}$, which feeds into a consensus function and, ultimately, output 1464. Other arrangements of stacking or bagging ensemble models are contemplated herein.

FIG. 14B demonstrates how techniques described herein may be applied with "Boosting" type ensemble models, such as AdaBoost. In FIG. 14B, an ensemble model 1499B includes a plurality of constituent models $1420_{1-N}$ that are arranged in series relative to each other. Gated layers $1462_{1-N}$ are implanted in the middle of these models similar to FIG. 14A. Once again a final gated layer $1462_{N+1}$ is implanted between the last model $1420_N$ and an output layer 1464. Other arrangements of boosting models with gated layers and/or individual gate nodes are contemplated herein.

Figure 15:
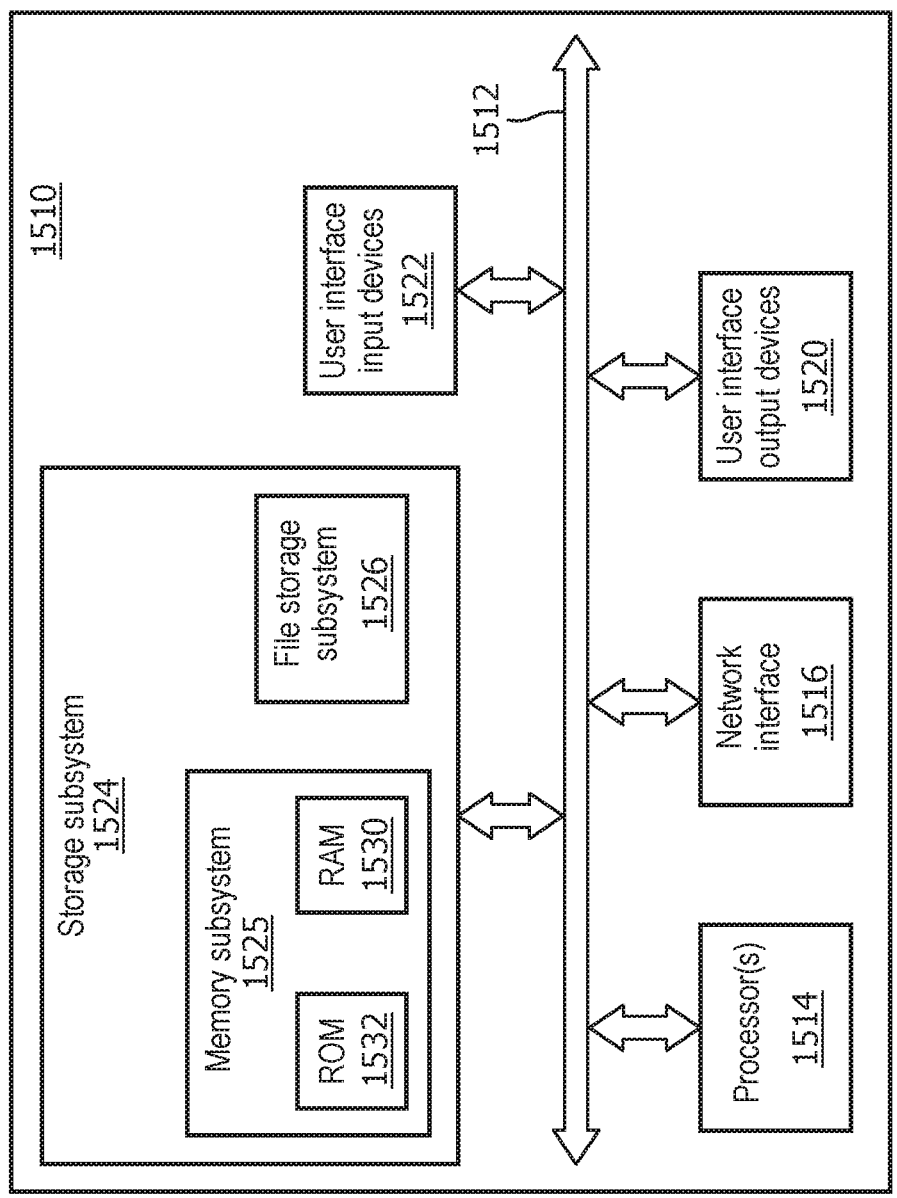
FIG. 15 depicts an example computing system architecture.

FIG. 15 is a block diagram of an example computer system 1510. Computer system 1510 typically includes at least one processor 1514 which communicates with a number of peripheral devices via bus subsystem 1512. These peripheral devices may include a storage subsystem 1524, including, for example, a memory subsystem 1525 and a file storage subsystem 1526, user interface output devices 1520, user interface input devices 1522, and a network interface subsystem 1516. The input and output devices allow user interaction with computer system 1510. Network interface subsystem 1516 provides an interface to outside networks and is coupled to corresponding interface devices in other computer systems.

User interface input devices 1522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1510 or onto a communication network.

User interface output devices 1520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1510 to the user or to another machine or computer system.

Storage subsystem 1524 stores programming and data constructs that provide the functionality of some or all of the modules described herein. For example, the storage subsystem 1524 may include the logic to perform selected aspects of the methods described herein and/or to implement one or more components depicted in the various figures.

These software modules are generally executed by processor 1514 alone or in combination with other processors. Memory 1525 used in the storage subsystem 1524 can include a number of memories including a main random access memory (RAM) 1530 for storage of instructions and data during program execution and a read only memory (ROM) 1532 in which fixed instructions are stored. A file storage subsystem 1526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1526 in the storage subsystem 1524, or in other machines accessible by the processor(s) 1514.

Bus subsystem 1512 provides a mechanism for letting the various components and subsystems of computer system 1510 communicate with each other as intended. Although bus subsystem 1512 is shown schematically as a single bus, alternative implementations of the bus subsystem may use multiple busses.

Computer system 1510 can be of varying types including a workstation, server, computing cluster, blade server, server farm, or any other data processing system or computing device. Due to the ever-changing nature of computers and networks, the description of computer system 1510 depicted in FIG. 15 is intended only as a specific example for purposes of illustrating some implementations. Many other configurations of computer system 1510 are possible having more or fewer components than the computer system depicted in FIG. 15.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A method implemented using one or more processors, comprising:
   providing a digital key that is associated with a particular entity, wherein the particular entity has access to a trained machine learning model that is trained to generate one or more outputs based on data applied across a plurality of inputs; causing the digital key to be applied as input across at least a first portion of the trained machine learning model to transition one or more gate nodes that are interspersed within the trained machine learning model between a locked and an unlocked state; and
   causing other input data to be applied as input across at least a second portion of the trained machine learning model to generate one or more of the outputs;
   wherein the one or more gate nodes include a gated layer of gate nodes located between two layers of the trained machine learning model having at least three layers including an input layer, one or more hidden layers, and an output layer,
   wherein the gated layer is configured to selectively control flow of processed data to and from the one or more hidden layers located between the input layer and the output layer of the trained machine learning model,
   wherein in the unlocked state, a given gate node of the one or more gate nodes allows data received from an upstream layer of the trained machine learning model to pass unaltered to a downstream layer of the trained machine learning model; and model,
   wherein in the locked state, the given gate node does not allow the data received from the upstream layer of the trained machine learning model to pass unaltered to the downstream layer of the trained machine learning model,
   wherein the one or more gate nodes of the gated layer is coupled to a node of the one or more hidden layers having a higher influence on the one or more outputs than other nodes of the one or more hidden layers, and
   wherein the gated layer is customizable for individual authorized users and operated by digital keys that indicate a level of access of the individual authorized users.

2. The method of claim 1, wherein in the unlocked state, the given gate node multiplies the data received from the upstream layer of the trained machine learning model by one, and in the locked state, the given gate node multiplies the data received from the upstream layer of the trained machine learning model by zero.

3. The method of claim 1, wherein the first portion of the trained machine learning model includes a first subset of consecutive input nodes of the input layer of the trained machine learning model, and wherein the second portion of the trained machine learning model includes a second subset of consecutive input nodes of the input layer of the trained machine learning model.

4. The method of claim 3, wherein the first and second subsets are coupled with an input scrambler that shuffles the first subset of consecutive input nodes with the second subset of consecutive input nodes.

5. The method of claim 4, wherein an input descrambler is coupled between one or more layers of the trained machine learning model that are downstream from the one or more hidden layers of the trained machine learning model.

6. The method of claim 1, wherein the gated layer is one of inserted between the two layers of the trained machine learning model post-training and implanted between two split portions of the trained machine learning model.

7. The method of claim 1, wherein the gate nodes of the gated layer are transitioned between the unlocked and locked states by a single key lock routine that receives, as input, the digital key.

8. The method of claim 1, wherein between the two layers of the trained machine learning, one or more of the gate nodes are coupled between a first pair of respective nodes of the two layers, and a second pair of respective nodes of the two layers are directly coupled.

9. The method of claim 1, wherein a first gate node of the one or more gate nodes is transitioned between the locked and unlocked state by a first portion of the digital key, and a second gate node of the one or more gate nodes is transitioned between the locked and unlocked state by a second portion of the digital key that is different than the first portion of the digital key.

10. A system comprising one or more processors and memory storing instructions that, in response to execution of the instructions by the one or more processors, cause the one or more processors to perform the following operations:
   providing a digital key that is associated with a particular entity, wherein the particular entity has access to a trained machine learning model that is trained to generate one or more outputs based on data applied across a plurality of inputs;
   causing the digital key to be applied as input across at least a first portion of the trained machine learning model to transition one or more gate nodes that are interspersed within the trained machine learning model between a locked and an unlocked state; and causing other input data to be applied as input across at least a second portion of the trained machine learning model to generate one or more of the outputs;
   wherein the one or more gate nodes include a gated layer of gate nodes located between two layers of the trained machine learning model having at least three layers including an input layer, one or more hidden layers, and an output layer,
   wherein the gated layer is configured to selectively control flow of processed data to and from the one or more hidden layers located between the input layer and the output layer of the trained machine learning model,
   wherein in the unlocked state, a given gate node of the one or more gate nodes allows data received from an upstream layer of the trained machine learning model to pass unaltered to a downstream layer of the trained machine learning and model, wherein in the locked state, the given gate node does not allow the data received from the upstream layer of the trained machine learning model to pass unaltered to the downstream layer of the trained machine learning model, and wherein the one or more gate nodes of the gated layer is coupled to a node of the one or more hidden layers having a higher influence on the one or more outputs than other nodes of the one or more hidden layers, and wherein the gated layer is customizable for individual authorized users and operated by digital keys that indicate a level of access of the individual authorized users.

11. The system of claim 10, wherein in the unlocked state, the given gate node multiplies the data received from the upstream layer of the trained machine learning model by one, and in the locked state, the given gate node multiplies the data received from the upstream layer of the trained machine learning model by zero.

12. The system of claim 10, wherein the first portion of the trained machine learning model includes a first subset of consecutive input nodes of the input layer of the trained machine learning model, and wherein the second portion of the trained machine learning model includes a second subset of consecutive input nodes of an input layer of the trained machine learning model.

13. The system of claim 12, wherein the first and second subsets are coupled with an input scrambler that shuffles the first subset of consecutive input nodes with the second subset of consecutive input nodes.

14. The system of claim 13, wherein an input descrambler is coupled between one or more layers of the trained machine learning model that are downstream from the one or more hidden layers of the trained machine learning model.

15. The system of claim 10, wherein the gated layer is one of inserted between the two layers of the trained machine learning model post-training and implanted between two split portions of the trained machine learning model.

16. The system of claim 10, wherein the gate nodes of the gated layer are transitioned between the unlocked and locked states by a single key lock routine that receives, as input, the digital key.

17. The system of claim 10, wherein between the two layers of the trained machine learning, one or more of the gate nodes are coupled between a first pair of respective nodes of the two layers, and a second pair of respective nodes of the two layers are directly coupled.

18. The system of claim 10, wherein a first gate node of the one or more gate nodes is transitioned between the locked and unlocked state by a first portion of the digital key, and a second gate node of the one or more gate nodes is transitioned between the locked and unlocked state by a second portion of the digital key that is different than the first portion of the digital key.

19. At least one non-transitory computer-readable medium comprising data forming a trained machine learning model, wherein the trained machine learning model comprises at least three layers, the at least three layers including:

an input layer that accepts a plurality of input data points;

at least one hidden layer for performing computations on the input data points; and an output layer for providing at least one output value based on the computations, wherein the trained machine learning model comprises a gated layer including at least one gate node located between two of the at least three layers, wherein at least one gate node, conditioned on at least one of the input data points, selectively allows or prevents data received from an upstream layer of the trained machine learning model to pass unaltered to a downstream layer of the trained machine learning model, wherein the at least one gate node of the gated layer is coupled to a node of the at least one hidden layer having a higher influence on the at least one output value than at least one other node of the at least one hidden layer, and wherein the gated layer is customizable for individual authorized users and operated by digital keys that indicate a level of access of the individual authorized users.

20. The at least one non-transitory computer-readable medium of claim 19, wherein the at least one of the input data points comprises one or more data points of a digital key that is applied as input across the trained machine learning model, and wherein the gated layer is one of inserted between the at least three layers of the trained machine learning model post-training and implanted between two split portions of the trained machine learning model.

* * * * *